United States Patent
Kishi et al.

(10) Patent No.: US 11,746,937 B2
(45) Date of Patent: Sep. 5, 2023

(54) PIPE JOINT, PUSH RING FOR PIPE JOINT, METHOD FOR JOINING PIPES

(71) Applicant: KUBOTA CORPORATION, Osaka (JP)

(72) Inventors: Shozo Kishi, Osaka (JP); Kazuya Ito, Amagasaki (JP); Kazuma Harada, Amagasaki (JP); Keita Oda, Amagasaki (JP); Ryunosuke Tanaka, Amagasaki (JP); Kohei Ikeda, Amagasaki (JP); Yuito Komaru, Amagasaki (JP)

(73) Assignee: KUBOTA CORPORATION, Osaka (JP)

( * ) Notice: Subject to any disclaimer, the term of this patent is extended or adjusted under 35 U.S.C. 154(b) by 434 days.

(21) Appl. No.: 16/981,872

(22) PCT Filed: Mar. 19, 2019

(86) PCT No.: PCT/JP2019/011384
§ 371 (c)(1),
(2) Date: Sep. 17, 2020

(87) PCT Pub. No.: WO2019/181918
PCT Pub. Date: Sep. 26, 2019

(65) Prior Publication Data
US 2021/0095798 A1    Apr. 1, 2021

(30) Foreign Application Priority Data

Mar. 20, 2018  (JP) ................................. 2018-051967
Mar. 20, 2018  (JP) ................................. 2018-051968
(Continued)

(51) Int. Cl.
*F16L 21/04* (2006.01)
*F16L 21/03* (2006.01)
*F16L 21/08* (2006.01)

(52) U.S. Cl.
CPC ............... *F16L 21/04* (2013.01); *F16L 21/03* (2013.01); *F16L 21/08* (2013.01)

(58) Field of Classification Search
CPC . F16L 17/06; F16L 17/02; F16L 21/04; F16L 21/03; F16L 21/08; F16L 25/06;
(Continued)

(56) References Cited

U.S. PATENT DOCUMENTS 1,884,064 A * 10/1932 McWane ............... F16L 21/035
285/295.2
2005/0110219 A1   5/2005 Tsuboi et al.
(Continued)

FOREIGN PATENT DOCUMENTS

CN     2625697 Y    7/2004
CN     1619195 A    5/2005
(Continued)

OTHER PUBLICATIONS

Extended European Search Report issued in corresponding European Patent Application No. 19771503.0 dated Nov. 9, 2021.
(Continued)

*Primary Examiner* — Aaron M Dunwoody
(74) *Attorney, Agent, or Firm* — KUSNER & JAFFE

(57) ABSTRACT

A pipe joint in which a seal body and a spacer are mounted from the insides of pipes, wherein: a spigot of one pipe is inserted into a socket of the other pipe; and an annular accommodation space is formed between the inner circumference of the socket and the outer circumference of the spigot. Inside the accommodation space are accommodated: a seal body for sealing the gap between the socket and the spigot; a push ring that presses the seal body to keep the seal body in a compressed state; and a spacer that maintains the interval between the push ring and the deep end of the socket in the pipe axial direction.

9 Claims, 31 Drawing Sheets

(30) Foreign Application Priority Data

Mar. 20, 2018 (JP) .................................. 2018-051969
Dec. 20, 2018 (JP) .................................. 2018-237820

(58) Field of Classification Search
CPC ......... F16L 25/065; F16L 25/08; F16L 27/12; F16L 27/127

See application file for complete search history.

(56) References Cited

U.S. PATENT DOCUMENTS

| | | |
|---|---|---|
| 2013/0076027 A1 | 3/2013 | Maenishi et al. |
| 2019/0137017 A1 | 5/2019 | Ishihara et al. |

FOREIGN PATENT DOCUMENTS

| | | | |
|---|---|---|---|
| CN | 103363223 | A | 10/2013 |
| CN | 206072593 | U | 4/2017 |
| JP | S59-100176 | U1 | 7/1984 |
| JP | H08-233171 | A | 9/1996 |
| JP | H10-332061 | A | 12/1998 |
| JP | 2002-327594 | A | 11/2002 |
| JP | 2003-185069 | A | 7/2003 |
| JP | 2003-240170 | A | 8/2003 |
| JP | 2005-337269 | A | 12/2005 |
| JP | 2006-070994 | A | 3/2006 |
| JP | 2011-256931 | A | 12/2011 |
| JP | 2017-072222 | A | 4/2017 |
| WO | WO 2017/169531 | | 10/2017 |

OTHER PUBLICATIONS

Notice of Reasons for Refusal issued in related Japanese Patent Application No. 2018-237820 dated Jun. 6, 2022 along with English-language translation.

Office Action issued in corresponding Chinese Patent Application No. 201980020151.4 dated Jun. 30, 2021 (English-language translation provided).

International Search Report from corresponding International Patent Application No. PCT/JP19/11384, dated May 7, 2019.

Office Action issued in corresponding Japanese Patent Application No. 2018-051967 dated Oct. 29, 2021 with English-language translation.

Office Action issued in corresponding Japanese Patent Application No. 2018-051968 dated Oct. 29, 2021 with English-language translation.

* cited by examiner

PIPE JOINT, PUSH RING FOR PIPE JOINT, METHOD FOR JOINING PIPES

FIELD OF THE INVENTION

The present invention relates to a pipe joint in which a spigot is inserted into a socket, a push ring used for the pipe joint, and a method for joining pipes using the pipe joint.

BACKGROUND OF THE INVENTION

Conventionally, in this kind of a pipe joint, for example, as illustrated in FIG. 37, a spigot 204 of one pipe 203 is inserted into a socket 202 of the other pipe 201, an annular seal body accommodation space is formed between the inner circumference of the socket 202 and the outer circumference of the spigot 204, and an annular rubber seal body 206 for sealing the gap between the inner circumference of the socket 202 and the outer circumference of the spigot 204 is accommodated in the seal body accommodation space. A push ring 208 for pressing the seal body 206 into the seal body accommodation space via a split ring 207 to keep the seal body 206 in a compressed state is provided inside the socket 202 of such a pipe joint 200.

A plurality of bolts 211 and joint rods 212 are provided in a pipe circumference direction between the push ring 208 and a deep end face 210 of the socket 202. The bolt 211 is screwed to the push ring 208, and as the bolt 211 is screwed out from the push ring 208, the joint rod 212 presses the deep end face 210 of the socket 202. With the reaction force at this moment, the push ring 208 presses the seal body 206 into the seal body accommodation space via the split ring 207, and the seal body 206 is kept in a compressed state to exhibit a predetermined sealing function.

Further, refer to, for example, Japanese Patent Laid-Open No. 2006-70994 for the pipe joint as described previously.

Technical Problem

However, in the aforementioned conventional form, since an inner circumference portion of the push ring 208, the bolt 211, and the joint rod 212 enter between a top end of the spigot 204 and the deep end face 210 of the socket 202, an interval 214 between the top end of the spigot 204 and the deep end face 210 of the socket 202 becomes wide. Accordingly, when the spigot 204 is inserted into the socket 202 with a predetermined insertion amount 215, a distance 216 from an open end face 205 of the socket 202 to the deep end face 210 becomes long, and in connection with this, there is a problem that the socket 202 disadvantageously becomes long in a pipe axial direction 217.

Additionally, in a joint portion between one pipe 201 and the other pipe 203, a stepped portion 219 extended outward of a pipe diameter direction 218 is formed between an inner circumference surface of the one pipe 201 and an inner circumference surface of the other pipe 203, and it has been difficult to shorten a range 220 of the stepped portion 219 in the pipe axial direction 217. Therefore, when water is passed through the pipes 201 and 203 after joining the pipes 201 and 203 to each other, a turbulent flow occurs in the stepped portion 219 of the joint portion.

As a countermeasure for suppressing the occurrence of such a turbulent flow, as illustrated in FIG. 38, the stepped portion 219 (that is, the space around the bolt 211 and the joint rod 212) has been filled with a mortar material 221, and the inner circumference surfaces of the pipes 201 and 203 and the inner circumference surface of the mortar material 221 have been made substantially flush with each other (have been made to substantially match). However, in this case, since the filling work of the mortar material 221 is required, the joining work of the pipes requires time and effort.

SUMMARY OF THE INVENTION

An object of the present invention is to provide a pipe joint capable of shortening the length of a socket, a push ring for the pipe joint, and a method of joining pipes.

Solution to Problem

A first aspect of the present invention is a pipe joint in which a seal body and a spacer are mounted from an inside of a pipe, wherein a spigot of one pipe is inserted into a socket of the other pipe, an annular accommodation space is formed between an inner circumference of the socket and an outer circumference of the spigot, and a seal body for sealing a gap between the socket and the spigot, a push ring that presses the seal body to keep the seal body in a compressed state, and a spacer that maintains an interval between the push ring and a deep end of the socket in a pipe axial direction are accommodated in the accommodation space.

According to this, since the seal body, the push ring, and the spacer are accommodated in the accommodation space, the seal body, the push ring, and the spacer do not enter between the top end of the spigot and the deep end of the socket. Thus, the interval between the top end of the spigot and the deep end of the socket can be narrowed, and accordingly, when inserting the spigot into the socket with a predetermined insertion amount, the distance from the open end to the deep end of the socket is shortened, and in connection with this, the socket is shortened in the pipe axial direction.

A second aspect of the present invention is the aforementioned pipe joint, wherein a top end of the spigot reaches the deep end of the socket.

According to this, since a stepped portion is hardly formed between the inner circumference surface of one pipe and the inner circumference surface of the other pipe in the joint portion between one pipe and the other pipe, the occurrence of a turbulent flow in the joint portion can be suppressed.

A third aspect of the present invention is the aforementioned pipe joint, wherein the push ring includes a pressing surface pressing the seal body, and an opposing surface opposed to the deep end of the socket in the pipe axial direction, a fitting portion is formed in the opposing surface, and one end of the spacer is fit into the fitting portion, and the other end of the spacer abuts the deep end of the socket.

According to this, by fitting one end of the spacer into the fitting portion of the push ring, and making the other end of the spacer abut the deep end of the socket, the spacer is attached between the push ring and the deep end of the socket, and the gap between the push ring and the deep end of the socket in the pipe axial direction is kept at a predetermined interval.

A fourth aspect of the present invention is the aforementioned pipe joint, wherein a plurality of spacers are provided at a predetermined interval in a pipe circumference direction, and a plurality of fitting portions are formed at a predetermined interval in a circumference direction of the push ring.

According to this, by fitting one end of each spacer into each fitting portion of the push ring, and making the other end of each spacer abut the deep end of the socket, each spacer is attached at the predetermined interval in the pipe circumference direction between the push ring and the deep end of the socket. Accordingly, it is possible to prevent one end of the spacer from being shifted in the pipe circumference direction with respect to the push ring, and the gap between the push ring and the deep end of the socket in the pipe axial direction is kept at the predetermined interval.

A fifth aspect of the present invention is the aforementioned pipe joint, wherein a lock ring accommodation groove is formed in the inner circumference of the socket, a lock ring is accommodated in the lock ring accommodation groove, and is externally fit onto the spigot, an outer circumference projecting portion projecting outward in a pipe diameter direction is formed in the outer circumference of the spigot, and the outer circumference projecting portion engages with the lock ring from a detachment direction of the spigot, so as to provide a separation preventive function to prevent the spigot from being detached from the socket.

According to this, when a separation force acts on the spigot due to an earthquake, etc., and the spigot is moved in the detachment direction with respect to the socket, the outer circumference projecting portion engages with the lock ring, and accordingly, it is possible to prevent the spigot from being detached from the socket.

A sixth aspect of the present invention is the aforementioned pipe joint, wherein the seal body includes a valve portion made of a soft elastic body, and a heel portion made of a hard elastic body, one end portion of the heel portion in the pipe axial direction is integrally connected to the valve portion, and the seal body is inserted into the accommodation space with the valve portion being a top end.

A seventh aspect of the present invention is the aforementioned pipe joint, wherein an annular projecting portion projecting inward in a pipe diameter direction, and a tapered seal body pressure contact surface are formed in the inner circumference of the socket, and the seal body pressure contact surface is located in a further back side of the socket than the annular projecting portion, and the diameter of the seal body pressure contact surface is reduced toward the annular projecting portion, and the seal body pressure contact surface faces the accommodation space.

According to this, the seal body accommodated in the accommodation space presses and contacts the seal body pressure contact surface, and is compressed between the outer circumference surface of the spigot and the seal body pressure contact surface of the socket.

An eighth aspect of the present invention is the aforementioned pipe joint, wherein a top end of the spigot and an end portion of the spacer abut the deep end of the socket.

A ninth aspect of the present invention is a push ring used for the pipe joint according to the aforementioned first aspect, the push ring including:

a pressing surface pressing the seal body; and a plurality of fitting portions formed at a predetermined interval in a circumference direction in a surface opposite to the pressing surface, wherein one end of the spacer can be fit into the fitting portion.

According to this, by fitting one end of each spacer into each fitting portion of the push ring, and making the other end of each spacer abut the deep end of the socket, it is possible to prevent one end of the spacer from being shifted in the pipe circumference direction with respect to the push ring, and each spacer is attached at the predetermined interval in the pipe circumference direction between the push ring and the deep end of the socket.

A tenth aspect of the present invention is a method of joining pipes by using a pipe joint including a seal body for sealing a gap between a socket of one pipe and a spigot of the other pipe, a push ring that presses the seal body to keep the seal body in a compressed state, and a spacer that maintains an interval between the push ring and a deep end of the socket in a pipe axial direction, the method including:

forming an opening between a top end of the spigot and the deep end of the socket in a state where the spigot is inserted into the socket;

setting at least the seal body and the spacer of the seal body, the push ring, and the spacer to an outer side of the spigot in a pipe diameter direction from an inside of a pipe through the opening; and accommodating the seal body, the push ring, and the spacer in an accommodation space formed between an inner circumference of the socket and an outer circumference of the spigot by further inserting the spigot into the socket to shorten the opening in the pipe axial direction.

According to this, the socket is shortened in the pipe axial direction.

Advantageous Effects of Invention

As described previously, according to the present invention, it is possible to shorten the length of the socket.

DETAILED DESCRIPTION OF THE INVENTION

Figure 1:
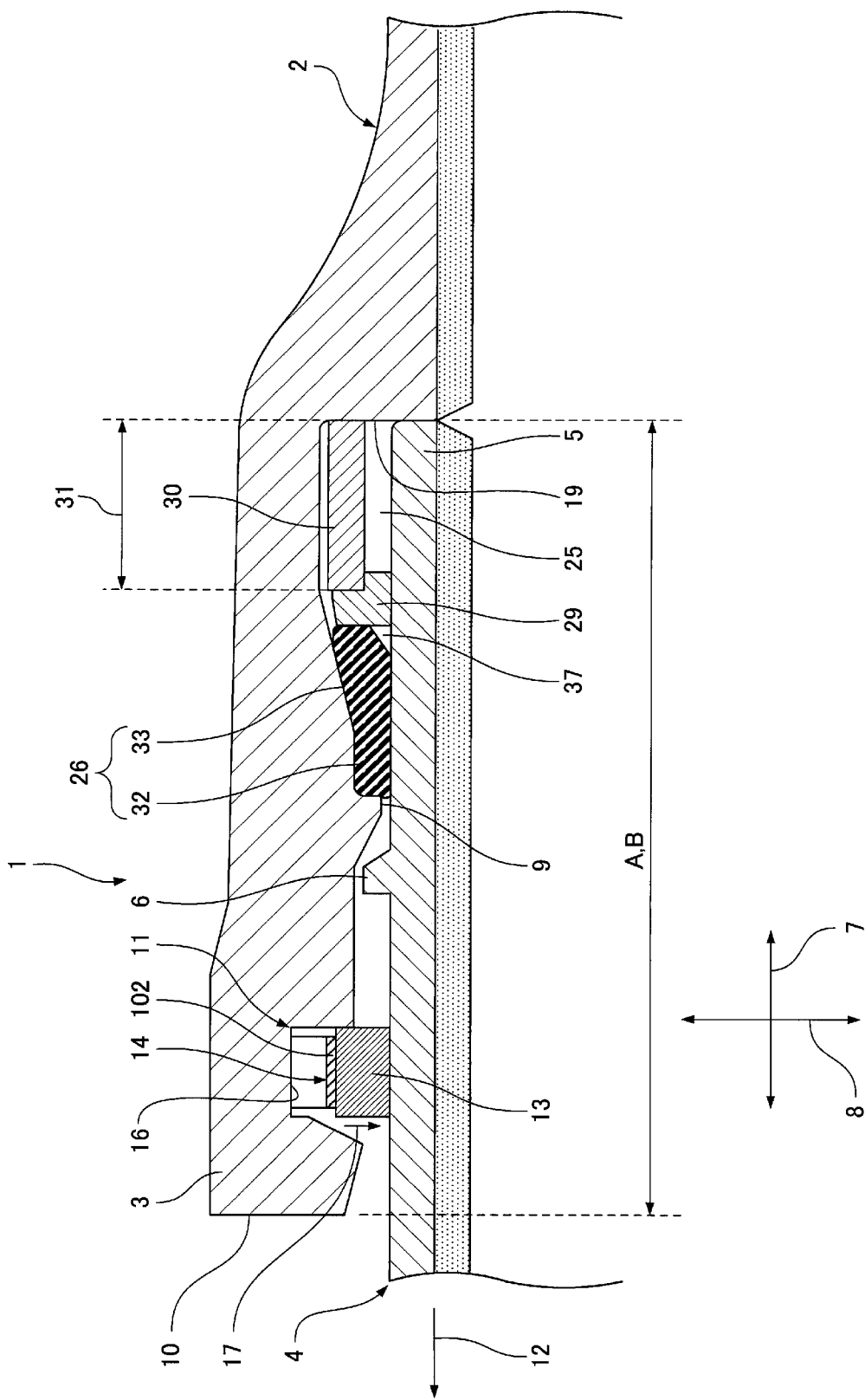
FIG. 1 is a cross-sectional view of a pipe joint in a first embodiment of the present invention.

Hereinafter, embodiments in the present invention will be described with reference to the drawings.

First Embodiment

In a first embodiment, a technique of performing the plumbing method in shield tunnel or employing the jacking method is used as the piping method of water pipelines. For example, the structure of a pipe joint 1 having a separation preventive function illustrated in FIG. 1 will be described below as a pipe joint for ductile iron pipes that can be used for such a plumbing method in shield tunnel or the jacking method.

A spigot 5 of one pipe 4 is inserted into a socket 3 of the other pipe 2, which are joined to each other, and a top end of the spigot 5 reaches a deep end face 19 of the socket 3. Additionally, an outer circumference projecting portion 6 projecting outward in a pipe diameter direction 8 is formed over an entire outer circumference of the spigot 5 at a position distant from the top end of the spigot 5 in a pipe axial direction 7. Note that the outer circumference projecting portion 6 includes the configuration in which a rising (projecting portion) is directly formed in the outer circumference of the spigot 5, the configuration in which a groove is formed in the outer circumference of the spigot 5, and the rising (projecting portion) is formed by fitting another member in the groove, or the configuration in which a groove is formed in the outer circumference of the spigot 5, and the portion between the top end of the spigot 5 and the groove functions as the outer circumference projecting portion. Additionally, the outer circumference projecting portion 6 is not limited to these configurations.

Figure 2:
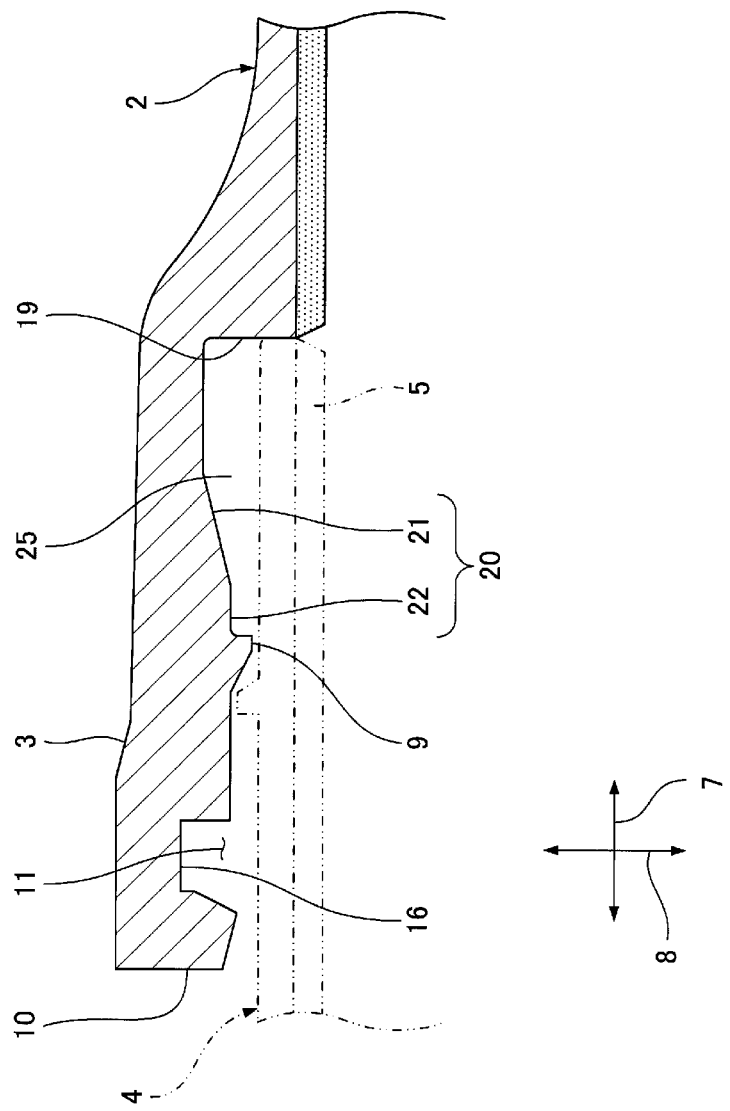
FIG. 2 is a cross-sectional view of a socket of the pipe joint in the first embodiment of the present invention.

As illustrated in FIG. 1 and FIG. 2, an annular projecting portion 9 projecting inward in the pipe diameter direction 8, and a lock ring accommodation groove 11 located between the annular projecting portion 9 and an open end portion 10 of the socket 3 are formed in the inner circumference of the socket 3.

Figure 3:
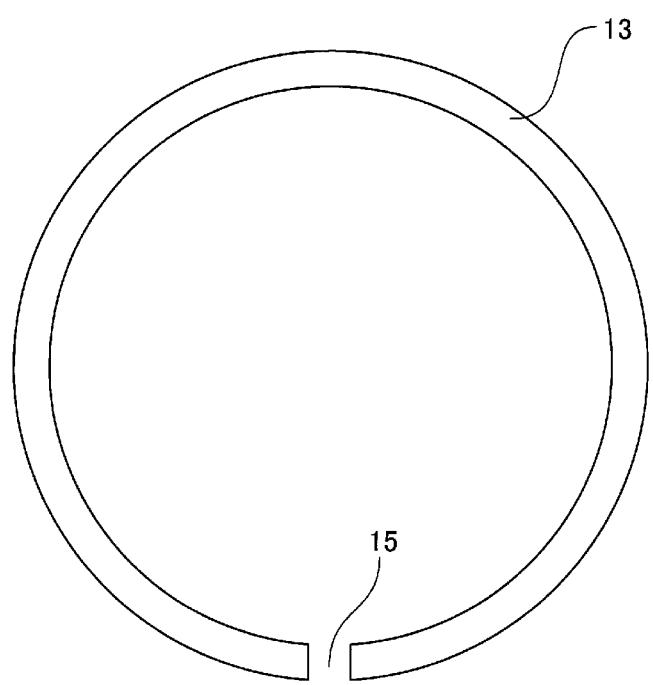
FIG. 3 is a diagram of a lock ring of the pipe joint in the first embodiment of the present invention.

A lock ring 13 that can be externally fit onto the spigot 5, and a pressing member 14 that presses the lock ring 13 in a pipe diameter inward direction 17 are accommodated in the lock ring accommodation groove 11. As illustrated in FIG. 3, the lock ring 13 is an annular ring having a single-split structure including a divided portion 15 in one place, and accordingly, the diameter of the lock ring 13 can be slightly increased or decreased.

Figure 4:
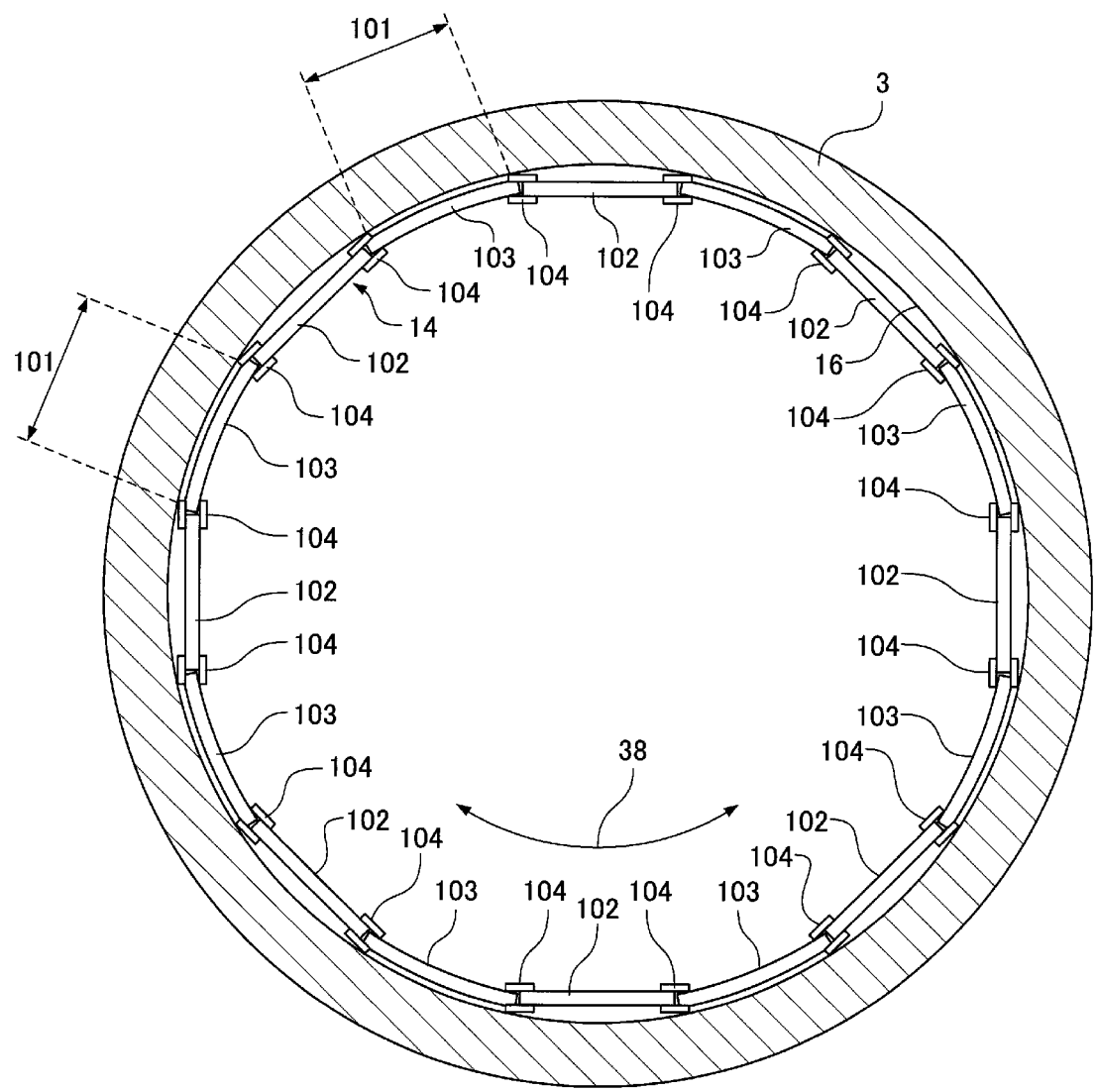
FIG. 4 is a cross-sectional view at the time when a pressing member is fitted into a lock ring accommodation groove of the pipe joint in the first embodiment of the present invention.
Figure 5:
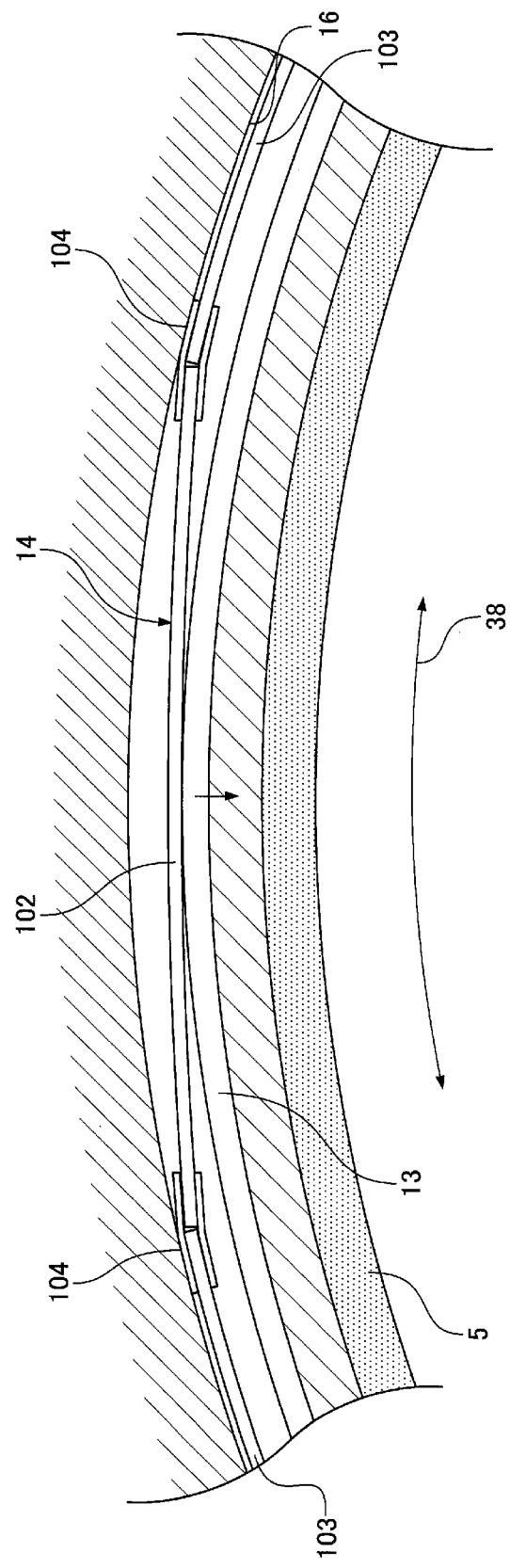
FIG. 5 is a partial enlarged view of the pressing member at the time when the pressing member and the lock ring are fitted into the lock ring accommodation groove of the pipe joint, and a spigot is inserted into the socket to join pipes to each other in the first embodiment of the present invention.

As illustrated in FIG. 4 and FIG. 5, the pressing member 14 is an annular member, and is provided between an outer circumference surface of the lock ring 13 and a bottom surface 16 of the lock ring accommodation groove 11. Additionally, the pressing member 14 includes a plurality of pressing bodies 102 arranged at a predetermined interval 101 in a pipe circumference direction 38, a plurality of interval maintaining bodies 103 for maintaining the interval between the adjacent pressing bodies 102 in the pipe circumference direction 38, and a plurality of connectors 104 for connecting an end portion of the pressing body 102 and an end portion of the interval maintaining body 103 in the pipe circumference direction 38.

Additionally, as illustrated in FIG. 1, the outer circumference projecting portion 6 is between the annular projecting portion 9 and the lock ring 13 in the pipe axial direction 7, and can be engaged with the lock ring 13 from a detachment direction 12 of the spigot 5.

An annular accommodation space 25 is formed over the entire circumference between the annular projecting portion 9 and the deep end face 19 of the socket 3 in the pipe axial direction 7, and between the inner circumference of the socket 3 and the outer circumference of the spigot 5. A seal body 26 for sealing the gap between the inner circumference of the socket 3 and the outer circumferences of the spigot 5, a push ring 29 that presses the seal body 26 to keep the seal body 26 in a compressed state, and a plurality of spacers 30 that maintain the interval between the push ring 29 and the deep end face 19 of the socket 3 in the pipe axial direction 7 at a predetermined interval 31 are accommodated in the accommodation space 25. Note that the predetermined interval 31 is an interval at the time when the seal body 26 is compressed to a compression amount required for sealing, and is defined by the design.

As illustrated in FIG. 2, a seal body pressure contact surface 20 is formed over the entire circumference on the inner circumference of the socket 3, and between the annular projecting portion 9 and the deep end face 19 of the socket 3 in the pipe axial direction 7. The seal body pressure contact surface 20 faces the accommodation space 25, and includes a tapered portion 21 whose diameter is reduced toward the annular projecting portion 9 from the back side of the socket 3, and a straight portion 22 reaching the annular projecting portion 9 from the tapered portion 21.

Figure 6:
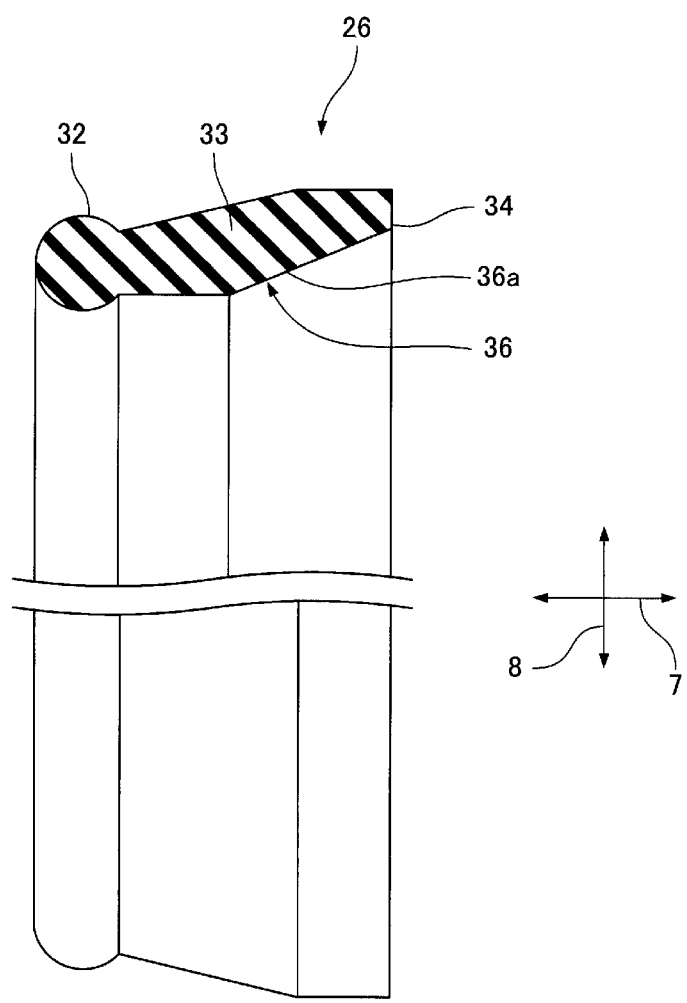
FIG. 6 is a diagram of a seal body of the pipe joint in the first embodiment of the present invention, illustrating a cross-section of a part of the seal body.

As illustrated in FIG. 6, the seal body 26 is an annular member including a valve portion 32 having a circular cross section made of a soft rubber (one example of an elastic body), and a heel portion 33 having a wedge-shaped cross section made of a hard rubber (one example of an elastic body). One end portion of the heel portion 33 in the pipe axial direction 7 is integrally connected to the valve portion 32. Additionally, a receiving surface 34 pressed by the push ring 29 is formed in the other end portion of the heel portion 33. Note that the seal body 26 is inserted into the accommodation space 25 with the valve portion 32 being the top end.

Figure 9:
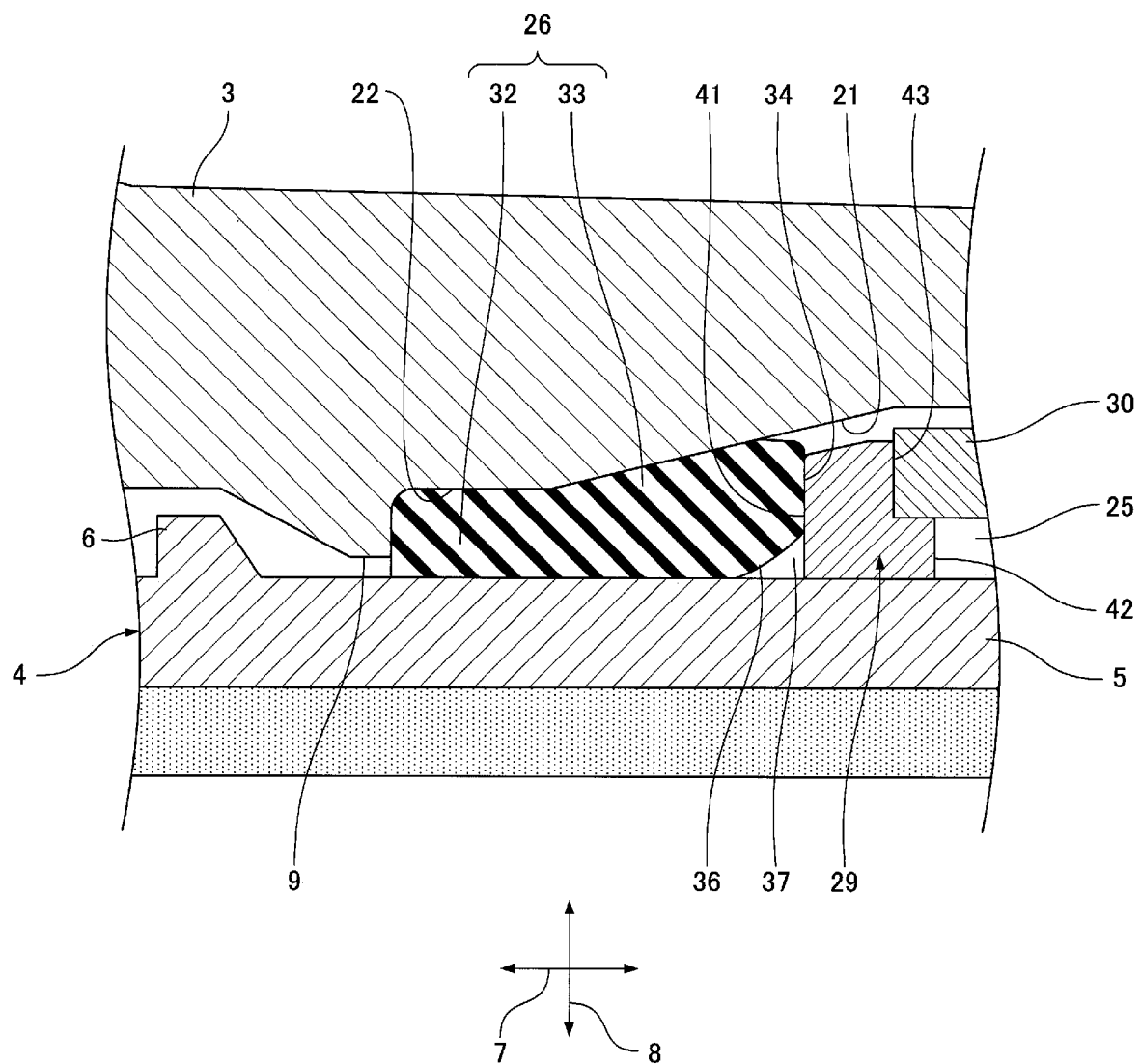
FIG. 9 is a partial enlarged cross-sectional view of the pipe joint in the first embodiment of the present invention.

A missing portion 36 is formed in the receiving surface 34 of the seal body 26. The missing portion 36 includes a tapered surface 36a whose diameter is expanded outward in the diameter direction from the inner circumference surface of the heel portion 33, and reaches the receiving surface 34 over the entire circumference. As illustrated in FIG. 1 and FIG. 9, the missing portion 36 forms an escape space 37 surrounded by the outer circumference surface of the spigot 5, the push ring 29, and the seal body 26.

As illustrated in FIG. 7 to FIG. 10, the push ring 29 is an annular ring having a single-split structure including a divided portion 40 in one place, and accordingly, the diameter of the push ring 29 can be slightly reduced. Additionally, the push ring 29 includes a pressing surface 41 that presses the seal body 26 toward the open end portion 10 from the back of the socket 3, and an opposing surface 42 (the surface on the opposite side of the pressing surface 41) that is formed on the opposite side of the pressing surface 41 in the pipe axial direction 7, and is opposed to the deep end face 19 of the socket 3.

A fitting portion 43 depressed toward the pressing surface 41 is formed in the opposing surface 42 over the entire circumference. Note that the fitting portion 43 is opened to the outer circumference of the push ring 29.

Figure 8:
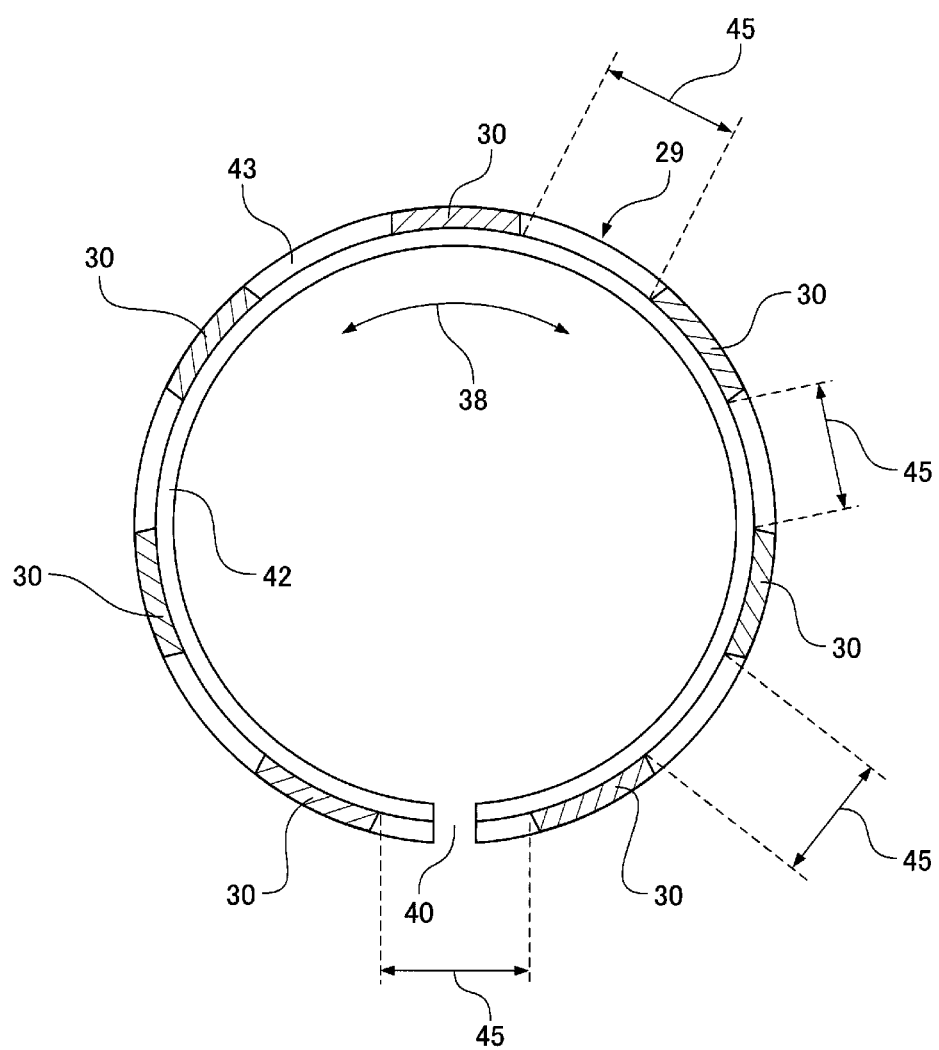
FIG. 8 is a diagram illustrating the push ring of the pipe joint, and the arrangement of spacers in the first embodiment of the present invention.

As illustrated in FIG. 1 and FIG. 8, the spacers 30 are metal boards, and are provided at a plurality of places at a predetermined interval 45 in the pipe circumference direction 38. As illustrated in FIG. 1 and FIG. 9, each spacer 30 is sandwiched between the deep end face 19 of the socket 3 and the push ring 29 in the pipe axial direction 7 by the repulsive force of the seal body 26. One end of each spacer 30 is fitted into a fitting portion 43 of the push ring 29, and the other end of each spacer 30 abuts the deep end face 19 of the socket 3.

Note that, as illustrated in FIG. 1, the top end of the spigot 5 and the other end of the spacer 30 abut the deep end face 19 of the socket 3 at the same position in the pipe axial direction 7.

A method of joining the pipes 2 and 4 of the aforementioned pipe joint 1 will be described below.

Figure 10:
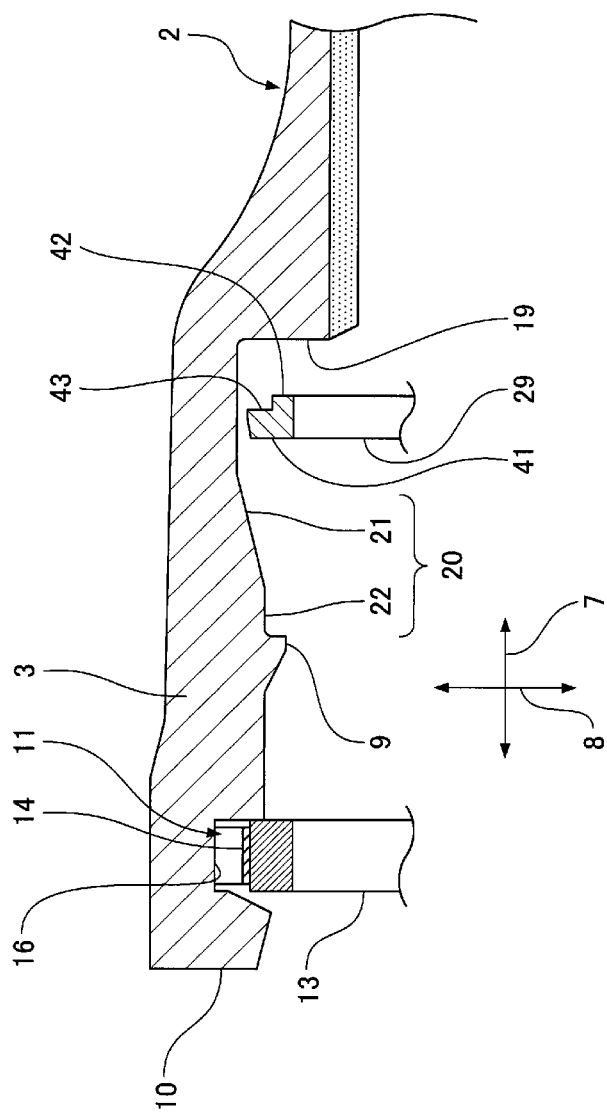
FIG. 10 is a cross-sectional view illustrating a method of joining pipes of the pipe joint in the first embodiment of the present invention, illustrating the state where the push ring and the lock ring have been inserted into the socket.

First, as illustrated in FIG. 10, the diameter of the push ring 29 is reduced, and in this state, the push ring 29 is inserted into the back inside the socket 3 from the open end portion 10 of the socket 3.

Next, as illustrated in FIG. 4, the plurality of pressing bodies 102, interval maintaining bodies 103, and connectors 104 are fitted into the lock ring accommodation groove 11 of the socket 3 to assemble the annular pressing member 14. Thereafter, an external force is applied to the lock ring 13, the diameter of the lock ring 13 is reduced, and in this reduced diameter state, the lock ring 13 is fitted into the lock ring accommodation groove 11 from the open end portion 10 of the socket 3. On this occasion, the divided portion 15 of the lock ring 13 is made to face a pipe bottom portion. Thereafter, by releasing the external force, the diameter of the lock ring 13 returns to the original diameter, and is accommodated in the lock ring accommodation groove 11 with the divided portion 15 facing down. Accordingly, as illustrated in FIG. 5 and FIG. 10, the pressing member 14 in the lock ring accommodation groove 11 is provided between the outer circumference surface of the lock ring 13 and the bottom surface 16 of the lock ring accommodation groove 11.

Figure 11:
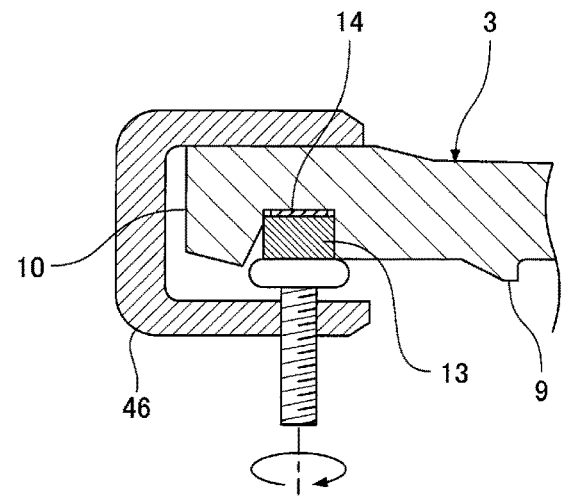
FIG. 11 is a cross-sectional view illustrating the method of joining the pipes of the pipe joint in the first embodiment of the present invention, illustrating the state where the diameter of the lock ring is expanded by using a C clamp.
Figure 12:
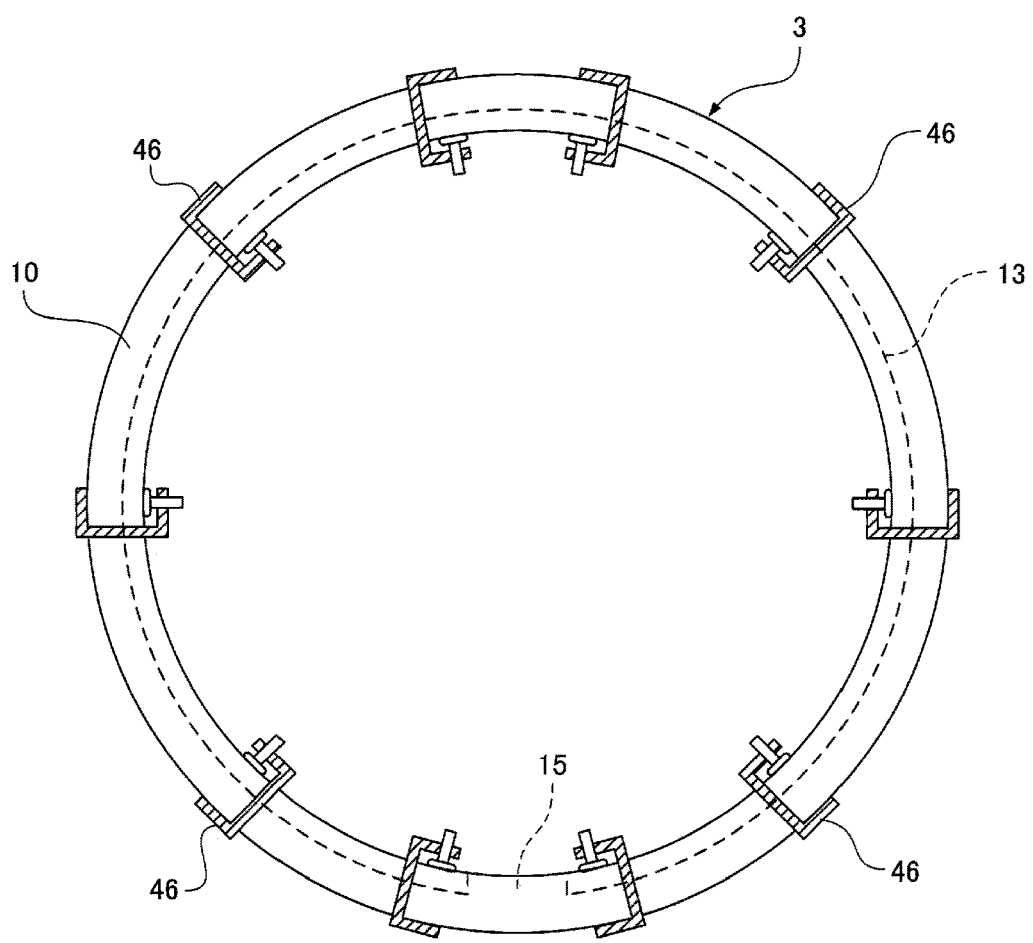
FIG. 12 is a diagram illustrating the method of joining the pipes of the pipe joint in the first embodiment of the present invention, illustrating the state where the diameter of the lock ring is expanded by using the C clamp.

Next, as illustrated in FIG. 11 and FIG. 12, a C clamp 46 (one example of a jig for diameter expansion) is set to the open end portion 10 of the socket 3, and the diameter of the lock ring 13 is expanded. At this time, this diameter expansion of the lock ring 13 is performed to the extent that the inner circumference surface of the lock ring 13 is flush with the inner circumference surface of the socket 3. Note that the C clamp 46 is set at a plurality of positions along the circumference direction of the lock ring 13.

On this occasion, although the lock ring 13 is pressed in the pipe diameter inward direction 17 by the plurality of pressing bodies 102 of the pressing member 14, as illustrated in FIG. 4, these pressing bodies 102 are not arranged over the entire circumference of the pressing member 14, but are arranged at the predetermined interval 101 in the pipe circumference direction 38. Therefore, the lock ring 13 is pressed in the pipe diameter inward direction 17 at a plurality of places at intervals in the pipe circumference direction 38, and is not pressed in the pipe diameter inward direction 17 over the entire circumference. Accordingly, the number of the jigs for diameter expansion, such as the C clamp 46, required for diameter expansion of the lock ring 13 can be reduced, and the time and effort and the labor required for the joining work of pipes can be reduced.

When the diameter of the lock ring 13 is expanded by using the C clamp 46 as described previously, the divided portion 15 of the lock ring 13 is also expanded in the circumference direction accordingly. Thus, as indicated by the solid lines in FIG. 13 and the solid lines in FIG. 14, a stopper 47 for preventing diameter reduction is fit into the expanded divided portion 15. Accordingly, the diameter reduction of the lock ring 13 is prevented, and the lock ring 13 is kept in a diameter expanded state.

Figure 15:
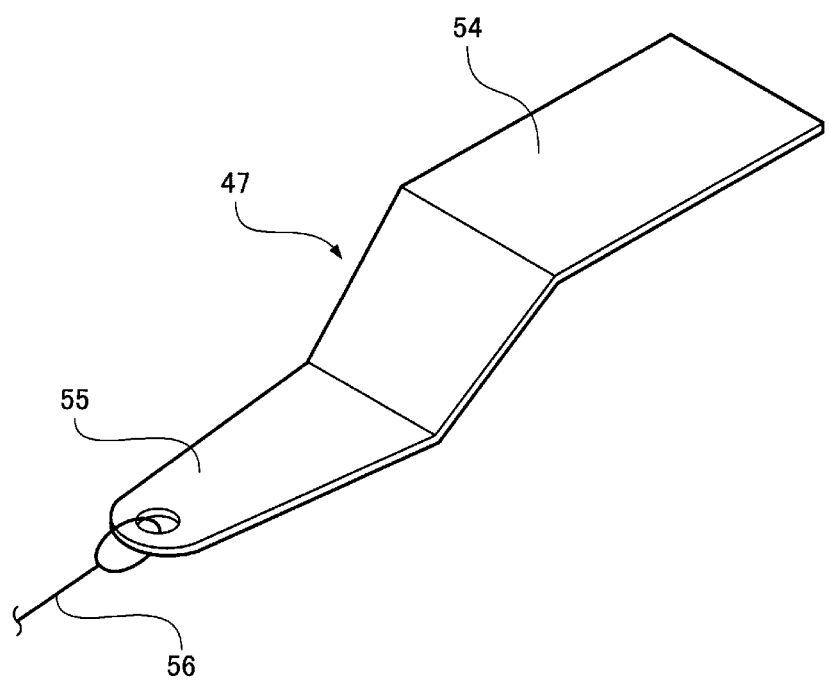
FIG. 15 is a perspective view of the stopper for preventing diameter reduction used at the time of joining the pipes of the pipe joint in the first embodiment of the present invention.

The stopper 47 for diameter reduction prevention is formed by a plate-shaped body as illustrated in FIG. 15, and integrally includes a wide fitting body 54 to be fit into the divided portion 15 of the lock ring 13, and an external projection piece 55. Note that the external projection piece 55 passes through the gap between the outer circumference of the spigot 5 and the inner circumference of the socket 3 from the position of the lock ring accommodation groove 11, and projects outward in front of the open end portion 10 of the socket 3. Additionally, a wire 56 for separation is connected to the external projection piece 55.

Figure 13:
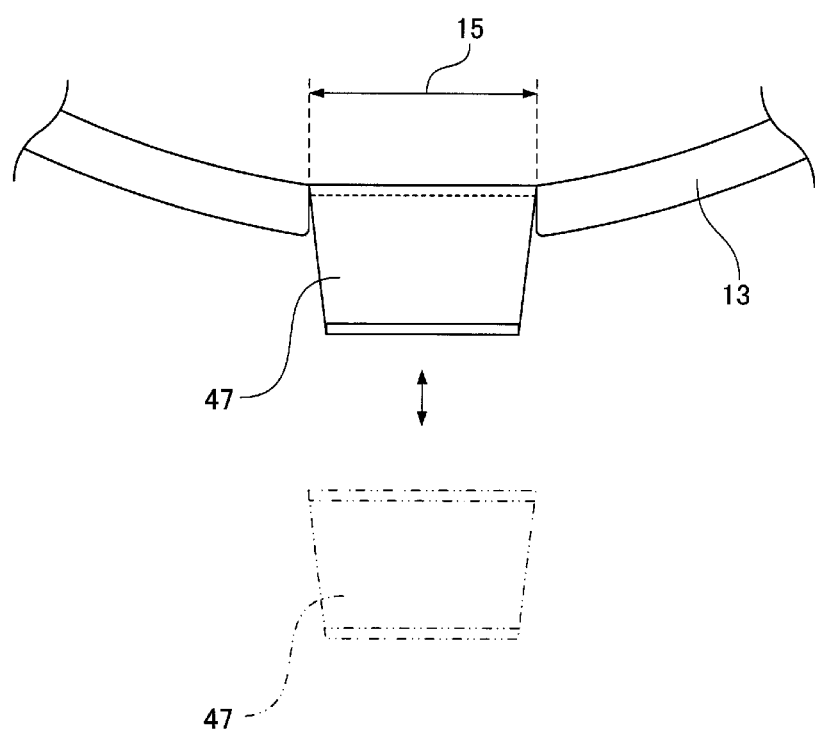
FIG. 13 is a diagram illustrating the method of joining the pipes of the pipe joint in the first embodiment of the present invention, illustrating the state where a stopper for preventing diameter reduction is fit into a divided portion of the lock ring.
Figure 14:
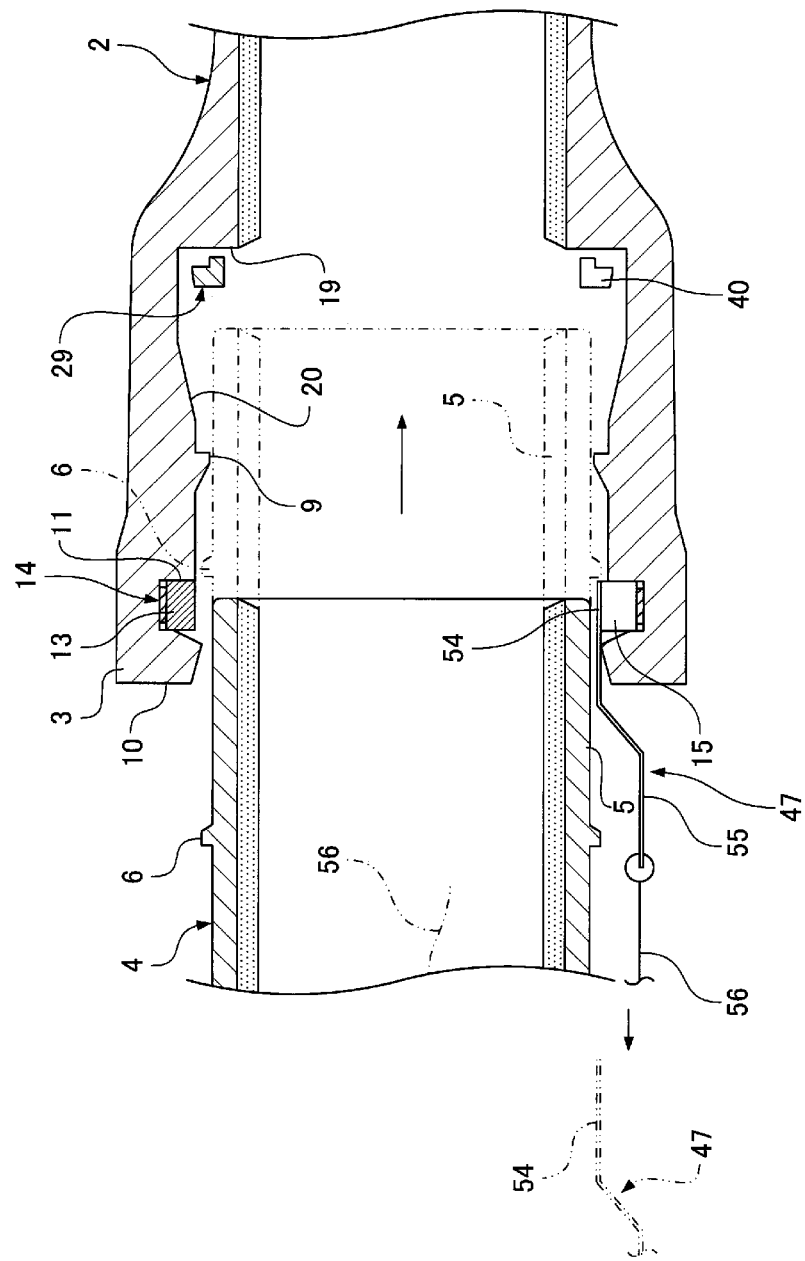
FIG. 14 is a cross-sectional view illustrating the method of joining the pipes of the pipe joint in the first embodiment of the present invention, illustrating the state where the stopper for preventing diameter reduction is fit into the divided portion of the lock ring.

As illustrated in FIG. 13 and FIG. 14, after setting the stopper 47 for diameter reduction prevention, all the C clamps 46 are removed from the open end portion 10 of the socket 3. Note that, on this occasion, the wire 56 for separation of the stopper 47 for diameter reduction prevention is introduced into the one pipe 4 from a socket side (illustration omitted) on the opposite side of the spigot 5 of the one pipe 4.

Then, as indicated by the virtual lines in FIG. 14, the spigot 5 is inserted into the inside of the socket 3 from the open end portion 10 of the socket 3. On this occasion, since the lock ring 13 is kept in the diameter expansion state by the stopper 47 for diameter reduction prevention, the outer circumference projecting portion 6 of the spigot 5 can pass through the inner side of the lock ring 13 from the open end portion 10 side of the socket 3 to the back side of the socket 3.

Figure 16:
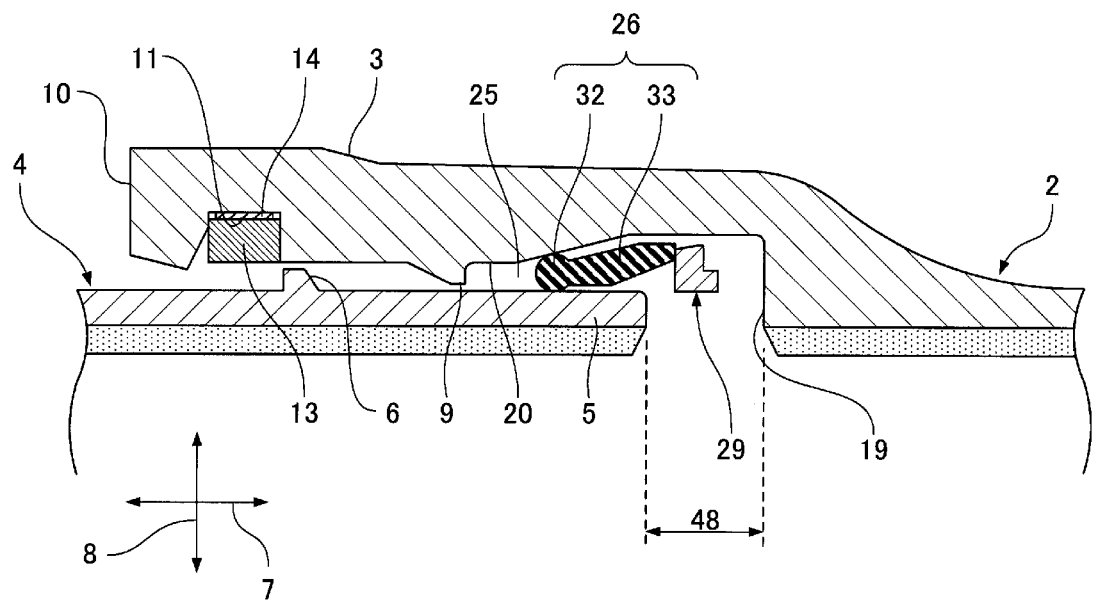
FIG. 16 is a cross-sectional view illustrating the method of joining the pipes of the pipe joint in the first embodiment of the present invention, illustrating the state where a spigot is inserted into a socket, and the seal body is put into the socket.

On this occasion, as illustrated in FIG. 16, the top end of the spigot 5 is stopped short of the deep end face 19, without reaching the deep end face 19 of the socket 3. Accordingly, an opening 48 is formed over the entire circumference between the top end of the spigot 5 and the deep end face 19 of the socket 3.

Thereafter, the seal body 26 is set to the outer side of the spigot 5 in the pipe diameter direction 8 via the opening 48 from the inside of the pipes 2 and 4, and is put between the seal body pressure contact surface 20 of the socket 3 and the outer circumference of the spigot 5. On this occasion, the push ring 29 is set between the seal body 26 and the deep end face 19 of the socket 3.

Figure 17:
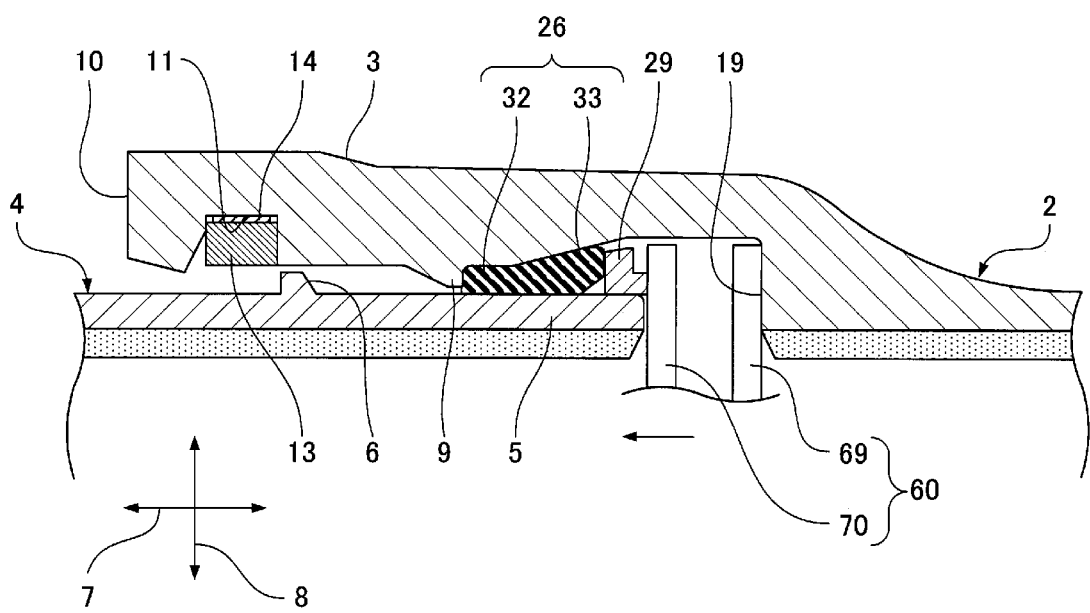
FIG. 17 is a cross-sectional view illustrating the method of joining the pipes of the pipe joint in the first embodiment of the present invention, illustrating the state where the interval between a push ring and a deep end face of the socket is expanded by using a jig for expansion.

Next, as illustrated in FIG. 17, by expanding the interval between the push ring 29 and the deep end face 19 of the socket 3 with the use of a plurality of jigs 60 for expansion, the push ring 29 presses the seal body 26, and the seal body 26 is pushed into the gap between the seal body pressure contact surface 20 of the socket 3 and the outer circumference of the spigot 5 to be kept in a compressed state.

Figure 18:
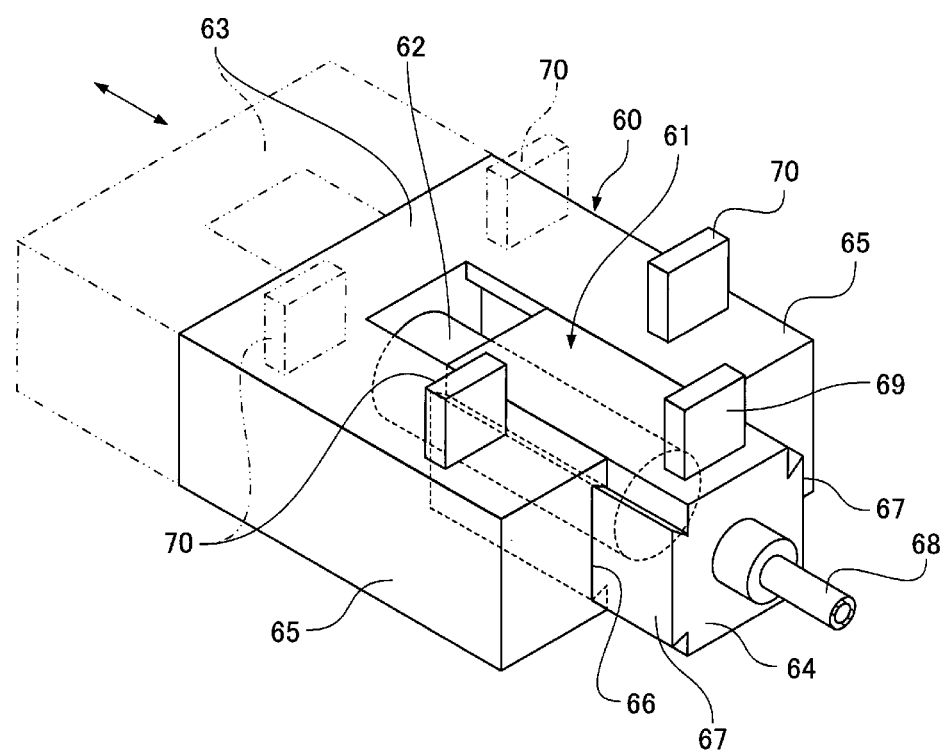
FIG. 18 is a perspective view of the jig for expansion used for the method of joining the pipes of the pipe joint in the first embodiment of the present invention.

Note that, as illustrated in FIG. 18, the jig 60 for expansion includes a hydraulic piston cylinder apparatus 61, a bracket 63, and a guide body 65. The piston cylinder apparatus 61 includes a piston 62, and a cylinder 64 for receiving the piston 62. The bracket 63 is provided at the top end of the piston 62. The guide body 65 is provided on the both sides of the bracket 63.

Dovetail grooves 66 are provided in the side surfaces of the guide body 65 facing each other, ridges 67 are formed on the side surfaces of the cylinder 64 that fit into the dovetail grooves 66 and can be slid along the length direction of the dovetail grooves 66, and the cylinder 64 is guided by the guide body 65 to slide in a reciprocating manner by increasing and decreasing the hydraulic pressure from a hydraulic pressure piping 68 communicating with the cylinder 64.

Then, claws 69 and 70, which engage with the push ring 29 and the deep end face 19 of the socket 3, respectively, are provided to project from the guide body 65 and the cylinder 64. As illustrated in FIG. 17, when a hydraulic pressure is supplied in the cylinder 64 by engaging the one claw 69 with the deep end face 19 of the socket 3, and engaging the other claws 70 with the push ring 29, the piston 62 extends from the cylinder 64, and the other claws 70 move from the back of the socket 3 toward the open end portion 10 with respect to the one claw 69. Accordingly, the interval between the push ring 29 and the deep end face 19 of the socket 3 is expanded, and the push ring 29 presses the seal body 26 toward the open end portion 10 from the back of the socket 3.

Note that the jigs 60 for expansion are set to a plurality of places in the pipe circumference direction 38, and press the push ring 29 as described previously by using the plurality of jigs 60 for expansion.

Figure 19:
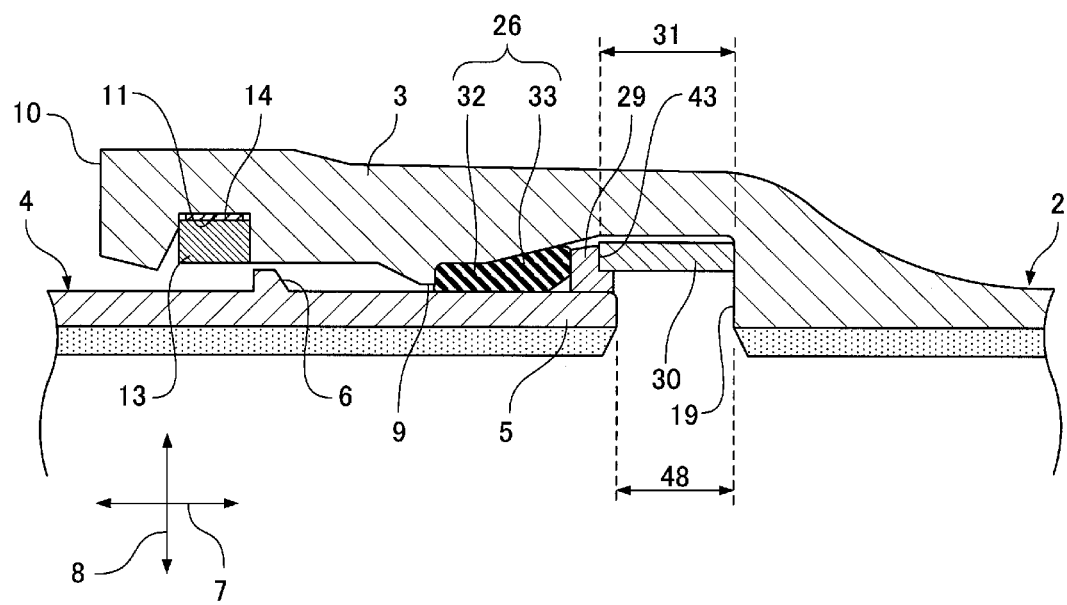
FIG. 19 is a cross-sectional view illustrating the method of joining the pipes of the pipe joint in the first embodiment of the present invention, illustrating the state where the spacer is set.

In such a state, as illustrated in FIG. 19, the spacer 30 is set to the outer side of the spigot 5 in the pipe diameter direction 8 via the opening 48 from the inside of the pipes 2 and 4, and on this occasion, one end of the spacer 30 in the pipe axial direction 7 is fit into the fitting portion 43 of the push ring 29, and the other end of the spacer 30 is made to abut the deep end face 19 of the socket 3. Accordingly, a plurality of spacers 30 are evenly set at the predetermined intervals 45 (refer to FIG. 8) at places where the jig 60 for expansion is not set. Note that the spacer 30 attached in this manner is sandwiched between the push ring 29 and the deep end face 19 of the socket 3 by the repulsive force of the seal body 26, and the gap between the push ring 29 and the deep end face 19 of the socket 3 in the pipe axial direction 7 is kept at the predetermined interval 31.

Figure 20:
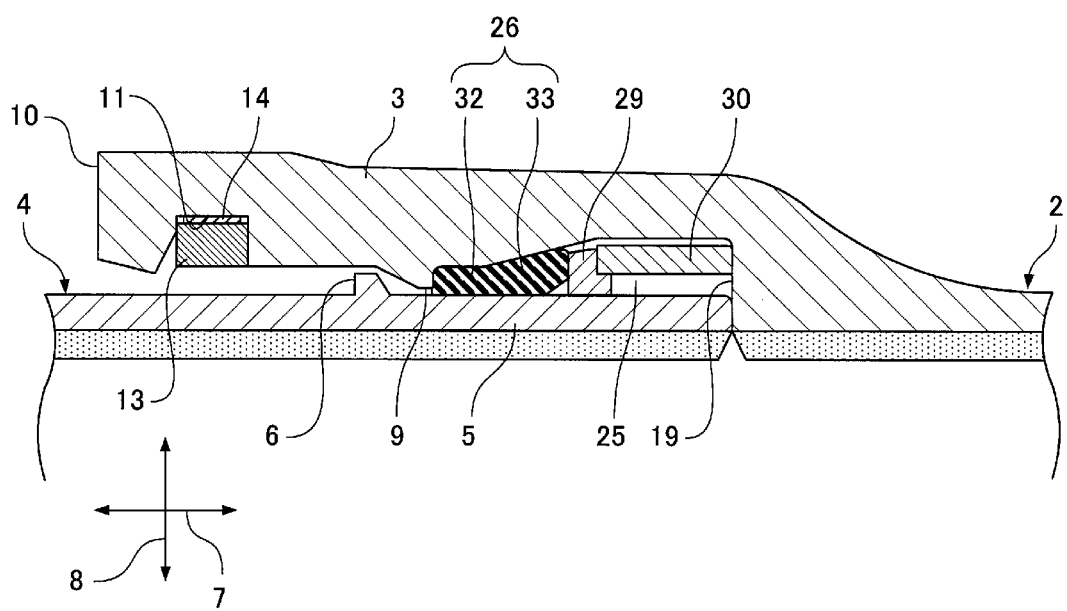
FIG. 20 is a cross-sectional view illustrating the method of joining the pipes of the pipe joint in the first embodiment of the present invention, illustrating the state where the spigot is further inserted into the socket, and a top end of the spigot abuts the deep end face of the socket.

Next, the jig 60 for expansion is removed, and the spigot 5 is inserted into the socket 3 until the top end of the spigot 5 abuts the deep end face 19 of the socket 3 as illustrated in FIG. 20. Accordingly, the opening 48 between the top end of the spigot 5 and the deep end face 19 of the socket 3 is closed, the accommodation space 25 is formed between the inner circumference of the socket 3 and the outer circumference of the spigot 5, and the seal body 26, the push ring 29, and the spacer 30 are accommodated in the accommodation space 25.

Thereafter, as indicated by the virtual lines in FIG. 13 and the virtual lines in FIG. 14, the wire 56 for separation is pulled in the one pipe 4 to remove the stopper 47 for diameter reduction prevention from the divided portion 15 of the lock ring 13. Accordingly, as illustrated in FIG. 1 and FIG. 5, since the lock ring 13 is pressed by the pressing bodies 102 of the pressing member 14 in the pipe diameter inward direction 17, the diameter of the lock ring 13 is reduced by the own elastic force of the lock ring 13 and the pressing force from the pressing bodies 102 to cling to the outer circumference of the spigot 5 over the entire circumference. Accordingly, the joining work of the pipes 2 and 4 is completed.

The actions and effects of the pipe joint 1 of the pipes 2 and 4 joined as described previously will be described below.

Since the seal body 26, the push ring 29, and the spacer 30 are accommodated in the accommodation space 25 as illustrated in FIG. 1, the seal body 26, the push ring 29, and the spacer 30 do not enter the gap between the top end of the spigot 5 and the deep end face 19 of the socket 3. Thus, the interval between the top end of the spigot 5 and the deep end face 19 of the socket 3 can be narrowed (the interval is set to 0 in FIG. 1), and accordingly, when inserting the spigot 5 into the socket 3 by a predetermined insertion amount A, a distance B from the open end portion 10 of the socket 3 to the deep end face 19 is shortened, and in connection with this, the socket 3 is shortened in the pipe axial direction 7.

Additionally, in the joint portion of the pipes 2 and 4, since a stepped portion is hardly formed between the inner circumference surface of one pipe 2 and the inner circumference surface of the other pipe 4, even if a mortar material is not filled, the occurrence of a turbulent flow in the joint portion can be suppressed.

Additionally, when a separation force acts on the spigot 5 due to an earthquake, etc., and the spigot 5 moves in the detachment direction 12 with respect to the socket 3, the outer circumference projecting portion 6 engages with the lock ring 13, and accordingly, it is possible to prevent the spigot 5 from being detached from the socket 3.

Additionally, according to the manufacturing tolerance, when the inner diameter of the socket 3 is manufactured to be small, and the outer diameter of the spigot 5 is manufactured to be large, and the interval between the inner circumference surface of the socket 3 and the outer circumference surface of the spigot 5 becomes narrow, the capacity of the accommodation space 25 becomes small. In this state, when the seal body 26 is pushed into the accommodation space 25 by the push ring 29, as illustrated in FIG. 9, the missing portion 36 of the seal body 26 forms the escape space 37 surrounded by the outer circumference surface of the spigot 5, the push ring 29, and the seal body 26, and a part of the excessively compressed seal body 26 is deformed to reduce the escape space 37.

In this manner, since a part of the excessively compressed seal body 26 is deformed to reduce the escape space 37, it is possible to suppress a part of the seal body 26 from entering the gap between the inner circumference surface of the socket 3 and the outer circumference surface of the push ring 29. Therefore, it is possible to prevent a part of the seal body 26 from being caught and damaged in the gap between the inner circumference surface of the socket 3 and the outer circumference surface of the push ring 29, and to suppress deterioration of the sealing function of the seal body 26.

Second Embodiment

Figure 21:
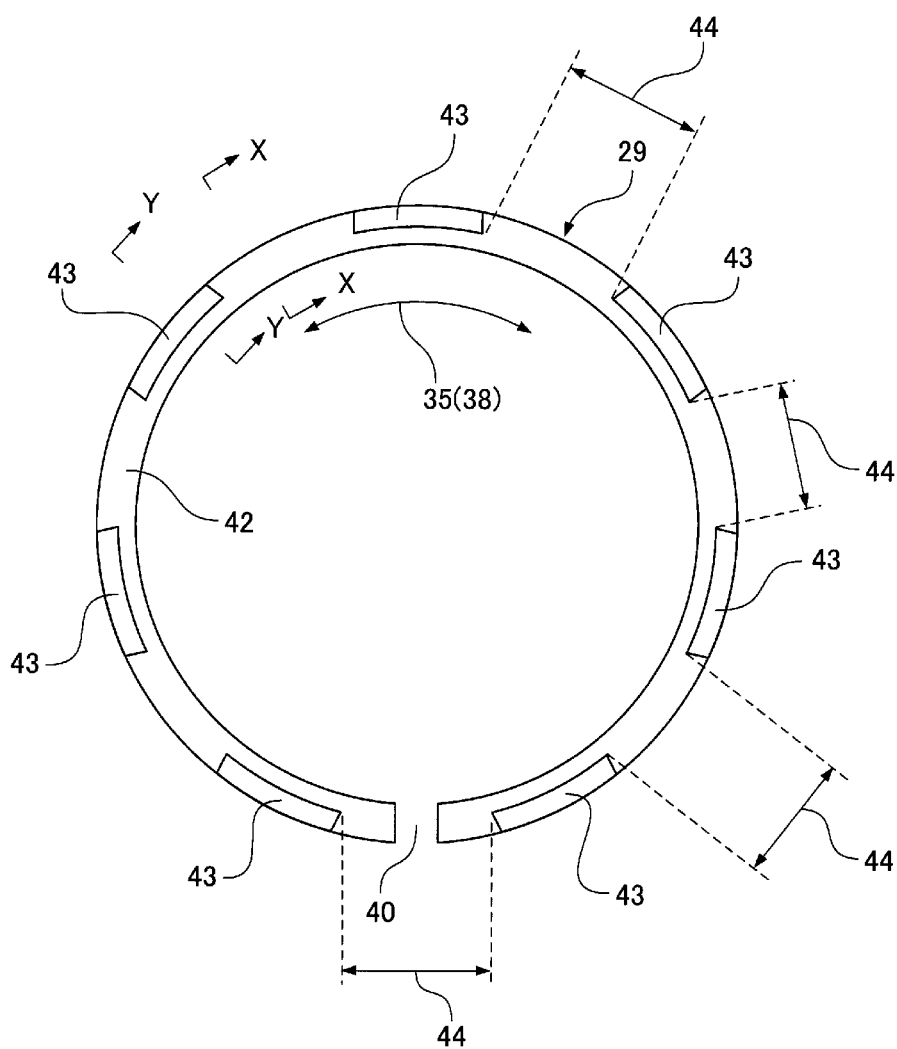
FIG. 21 is a diagram of a push ring of a pipe joint in a second embodiment of the present invention.
Figure 22:
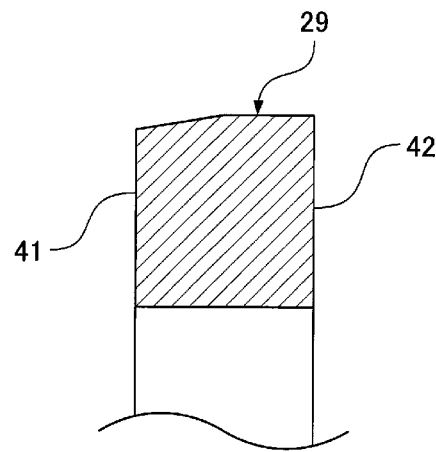
FIG. 22 is an X-X arrow view in FIG. 21.
Figure 23:
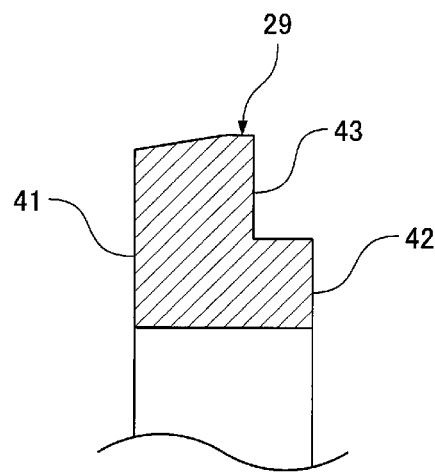
FIG. 23 is a Y-Y arrow view in FIG. 21.

In a second embodiment, as illustrated in FIG. 21 to FIG. 23, a plurality of fitting portions 43 are formed at a predetermined interval 44 on an opposing surface 42 of a push ring 29 in a circumference direction 35.

According to this, by fitting one end of each spacer 30 into each fitting portion 43 of the push ring 29, and abutting the other end of each spacer 30 to a deep end face 19 of a socket 3, each spacer 30 is attached at a predetermined interval 45 (refer to FIG. 8) in a pipe circumference direction 38 (the circumference direction 35 of the push ring 29) between the push ring 29 and the deep end face 19 of the socket 3. Accordingly, it is possible to prevent one end of the spacer 30 from shifting in the pipe circumference direction 38 with respect to the push ring 29, and the gap between the push ring 29 and the deep end face 19 of the socket 3 in a pipe axial direction 7 is kept at a predetermined interval 31 (refer to FIG. 1).

Third Embodiment

Figure 24:
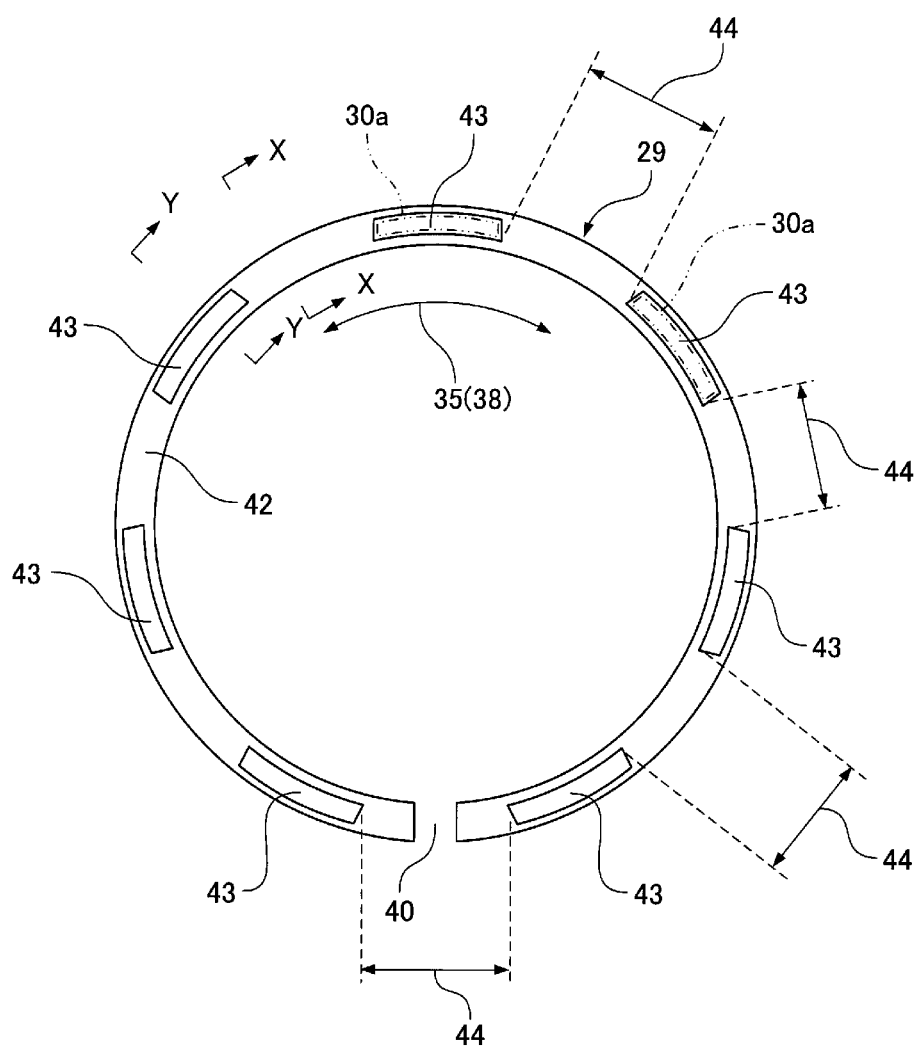
FIG. 24 is a diagram of a push ring of a pipe joint in a third embodiment of the present invention.
Figure 25:
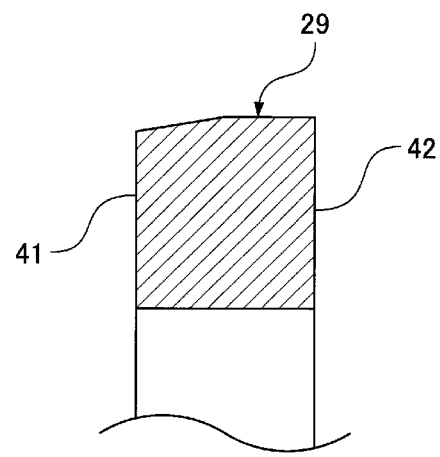
FIG. 25 is an X-X arrow view in FIG. 24.
Figure 26:
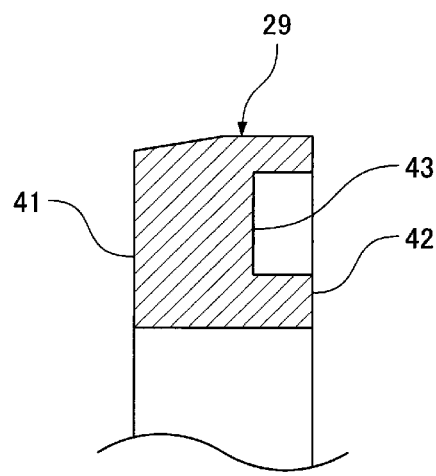
FIG. 26 is a Y-Y arrow view in FIG. 24.

In a third embodiment, as illustrated in FIG. 24 to FIG. 26, a plurality of fitting portions 43 are formed at a predetermined interval 44 on an opposing surface 42 of a push ring 29 in a circumference direction 35. Further, each fitting portion 43 is between an inner circumference surface and an outer circumference surface of the push ring 29, is not opened to the outer circumference of the push ring 29, and is depressed in a concave shape.

Figure 27:
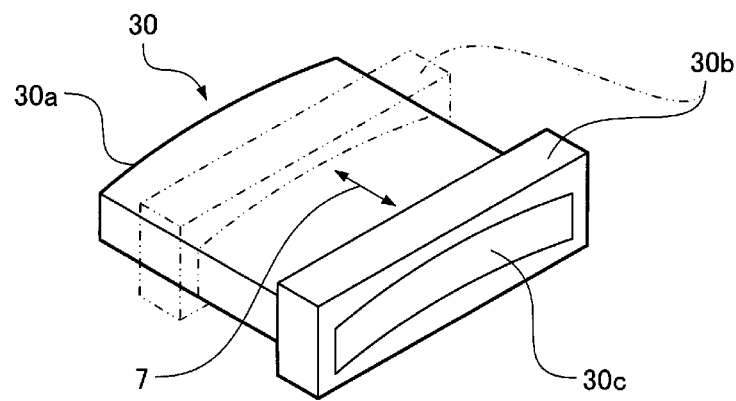
FIG. 27 is a perspective view of a spacer of the pipe joint in the third embodiment of the present invention.
Figure 28:
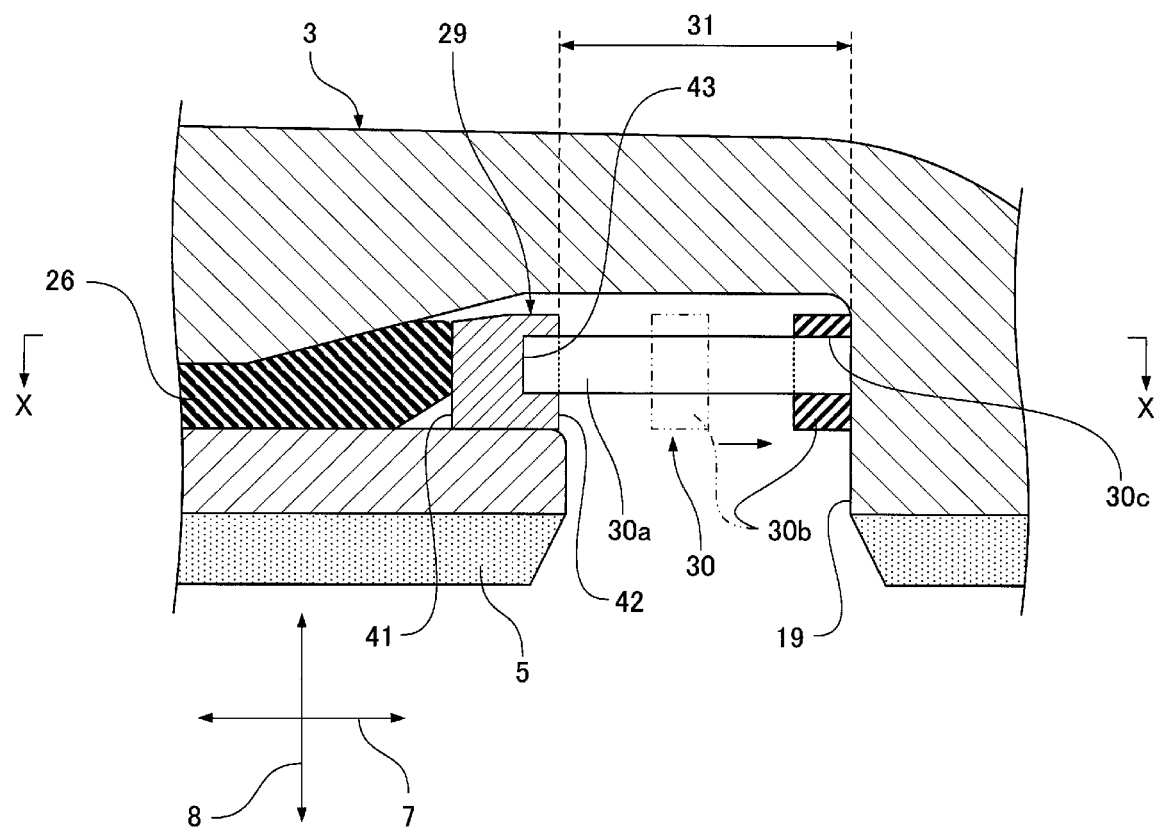
FIG. 28 is a diagram in which the spacer of the pipe joint is set between the push ring and a deep end face of a socket in the third embodiment of the present invention.
Figure 29:
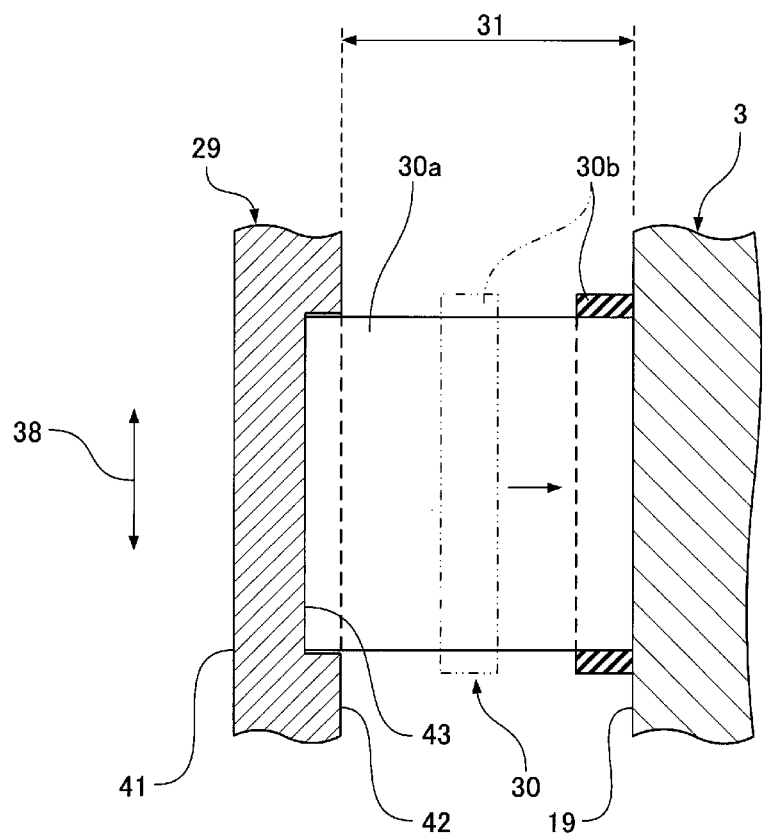
FIG. 29 is an X-X arrow view in FIG. 28.

Additionally, as illustrated in FIG. 27 to FIG. 29, each spacer 30 includes a metal board member 30a, and a dropout prevention body 30b provided on the other end of the board member 30a. The dropout prevention body 30b is made of an elastic material, such as rubber, and includes an attachment hole 30c. By inserting the other end of the board member 30a into the attachment hole 30c of the dropout prevention body 30b, as indicated by each solid line in FIG. 27 and FIG. 28, the dropout prevention body 30b is attached to the other end of the board member 30a.

Note that the position of the dropout prevention body 30b can be moved in a pipe axial direction 7 with respect to the board member 30a by applying an external force equal to or more than a constant level to the dropout prevention body 30b.

Hereinafter, the actions in the aforementioned configuration will be described.

As indicated by each virtual line in FIG. 27 to FIG. 29, the position of the dropout prevention body 30b of each spacer 30 is moved in advance to a center portion of the board member 30a, one end of the board member 30a of the spacer 30 is fit into each fitting portion 43 of the push ring 29, and the other end of the board member 30a is made to abut a deep end face 19 of a socket 3.

Thereafter, as indicated by each solid line in FIG. 27 to FIG. 29, the position of the dropout prevention body 30b is moved to the other end of the board member 30a, and the dropout prevention body 30b is made to abut the deep end face 19 of the socket 3. Accordingly, each spacer 30 is attached at a predetermined interval 45 (refer to FIG. 8) in a pipe circumference direction 38 between the push ring 29 and the deep end face 19 of the socket 3.

On this occasion, it is possible to prevent one end of the spacer 30 from shifting in a pipe diameter direction 8 and the pipe circumference direction 38 with respect to the push ring 29, and the gap between the push ring 29 and the deep end face 19 of the socket 3 in the pipe axial direction 7 is kept at a predetermined interval 31 (refer to FIG. 1).

Additionally, even when the repulsive force of a seal body 26 is decreased due to the water pressure in the pipes 2 and 4, or the deformation of the seal body 26, etc., since the dropout prevention body 30b of each spacer 30 abuts the deep end face 19 of the socket 3, the contact area between the other end of each spacer 30 and the deep end face 19 of the socket 3 is increased, and it is possible to prevent the spacer 30 from coming off and dropping out from the deep end face 19 of the socket 3.

Note that, although the dropout prevention body 30b made of an elastic material, such as rubber, is mentioned in the aforementioned third embodiment, a fit-in type dropout prevention body 30b made by press working on a metal material may also be used. Additionally, the dropout prevention body 30*b* may be integrally fixed to the other end of the board member 30*a*.

Fourth Embodiment

In a fourth embodiment, as illustrated in FIG. 30 to FIG. 35, each spacer 30 includes a metal board member 30*a*, and a dropout prevention body 110 detachably provided to the board member 30*a*. The dropout prevention body 110 prevents the dropout of the spacer 30, is made of rubber (one example of an elastic body), and includes one abutting body 111, the other abutting body 112, and a connecting body 113 provided between the one abutting body 111 and the other abutting body 112.

One abutting body 111 includes one rectangle hole 115 penetrating in a pipe axial direction 7, one projecting portion 116 projecting outward in a pipe diameter direction 8, and one abutting surface 117 abutting an opposing surface 42 of a push ring 29. In addition, similarly, the other abutting body 112 also includes the other rectangle hole 120 penetrating in the pipe axial direction 7, the other projecting portion 121 projecting outward in the pipe diameter direction 8, and the other abutting surface 122 abutting a deep end face 19 of a socket 3. Note that the one abutting body 111 and the other abutting body 112 have the same shape.

The connecting body 113 includes a pair of a flat inner side connecting body 125 and a flat outer side connecting body 126. The inner side connecting body 125 and the outer side connecting body 126 are opposed to each other in the pipe diameter direction 8, and an insertion space 127 corresponding to the thickness of the board member 30*a* is formed between the inner side connecting body 125 and the outer side connecting body 126. Additionally, the inner side connecting body 125 and the outer side connecting body 126 can be stretched and contracted in the pipe axial direction 7.

Figure 35:
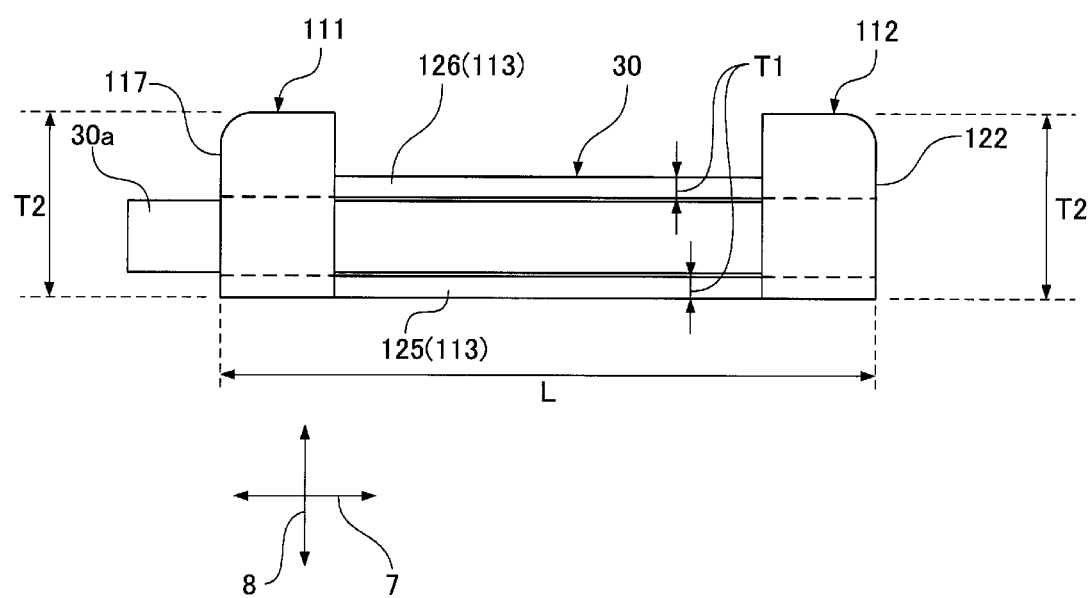
FIG. 35 is an X-X arrow view in FIG. 34.

As illustrated in FIG. 35, a thickness T1 of each of the inner side connecting body 125 and the outer side connecting body 126 in the pipe diameter direction 8 is thinner than a thickness T2 of each of the one abutting body 111 and the other abutting body 112.

Figure 34:
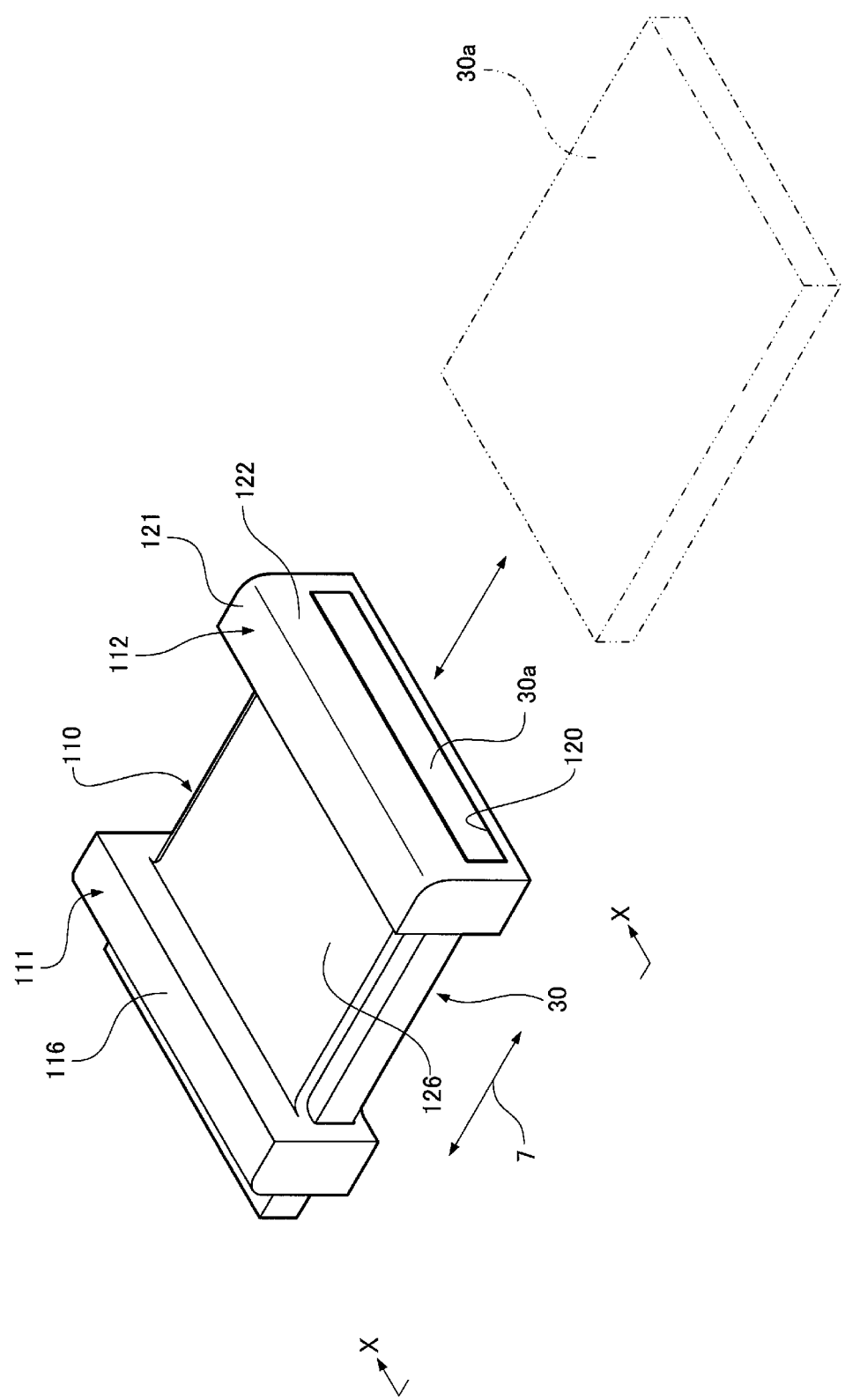
FIG. 34 is a perspective view of a spacer of the pipe joint in the fourth embodiment of the present invention.

As illustrated in FIG. 34, by inserting the board member 30*a* into the one hole 115 of the dropout prevention body 110, the insertion space 127, and the other hole 120, the one abutting body 111 and the other abutting body 112 are externally fit onto the board member 30*a*, and the dropout prevention body 110 is attached to the board member 30*a*. Note that the one abutting body 111 and the other abutting body 112 can slide in the pipe axial direction 7 with respect to the board member 30*a*.

Figure 30:
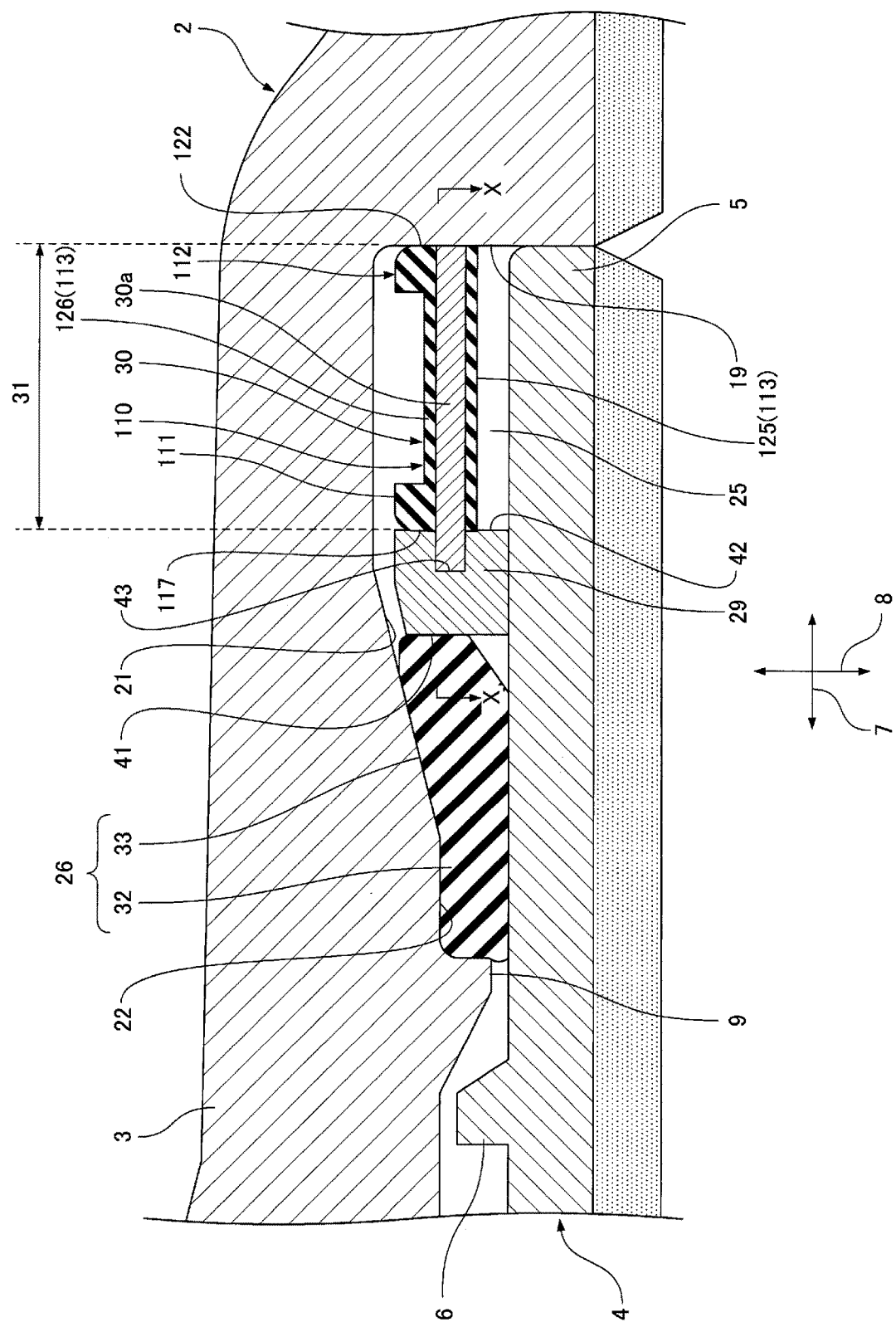
FIG. 30 is a partial enlarged cross-sectional view of a pipe joint in a fourth embodiment of the present invention.
Figure 31:
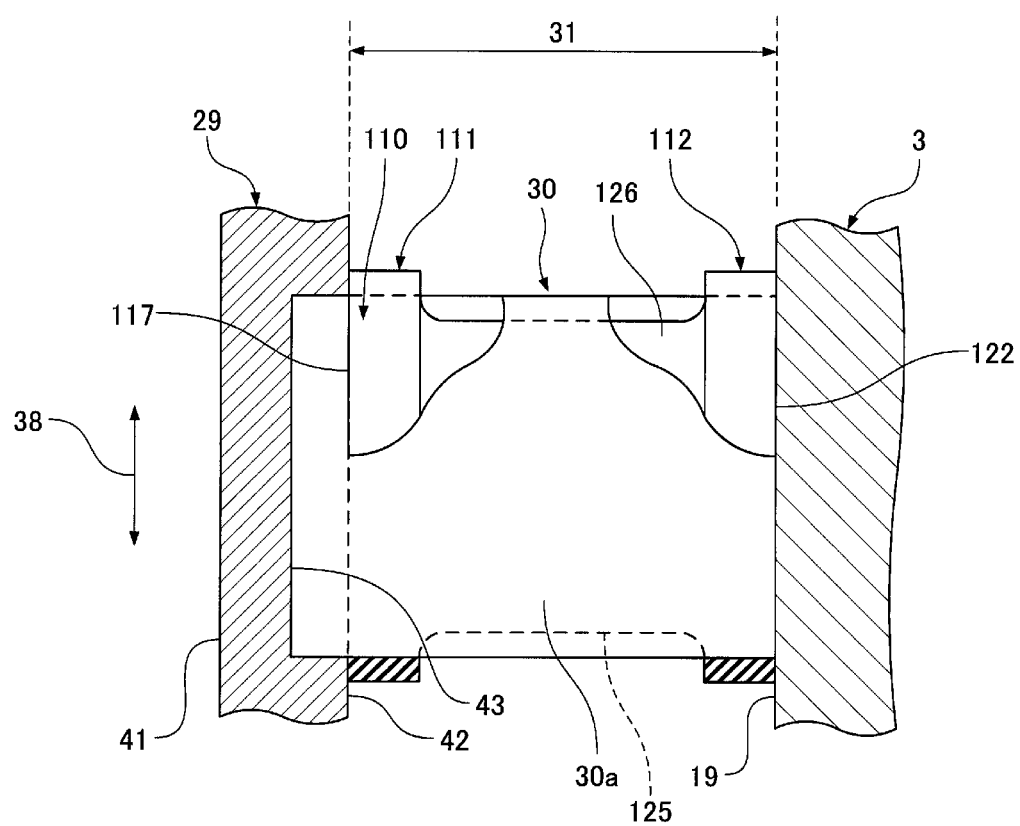
FIG. 31 is an X-X arrow view in FIG. 30.
Figure 32:
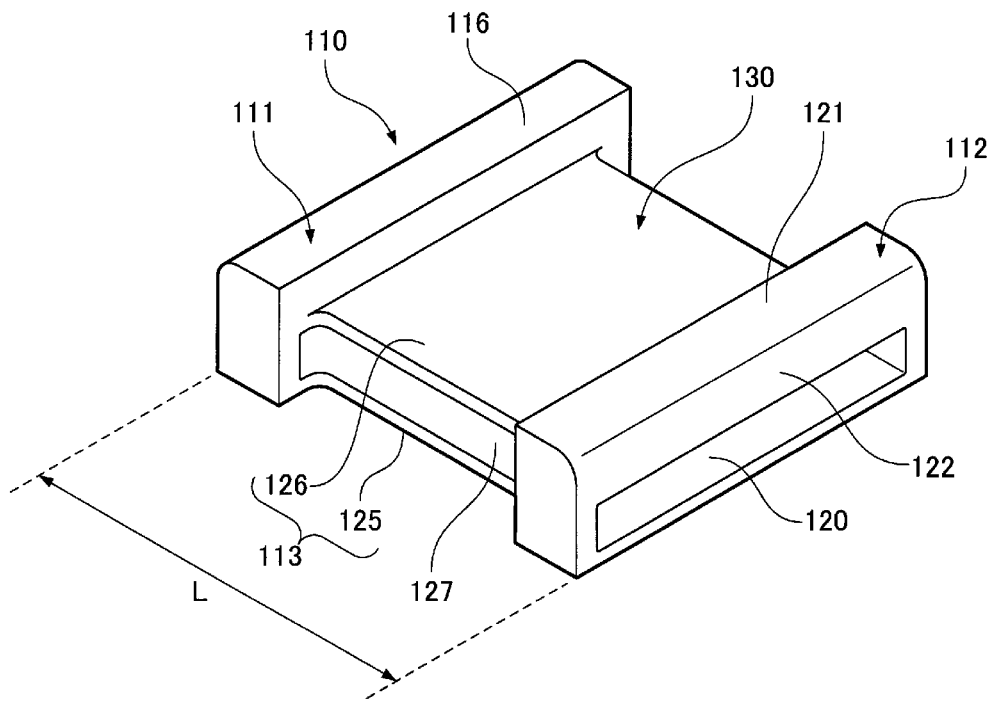
FIG. 32 is a perspective view seen from an outer surface side of a dropout prevention member of the pipe joint in the fourth embodiment of the present invention.

Additionally, as illustrated in FIG. 32, a total length L of the dropout prevention body 110 removed from the board member 30*a* is made slightly longer than a predetermined interval 31 illustrated in FIG. 30.

Figure 33:
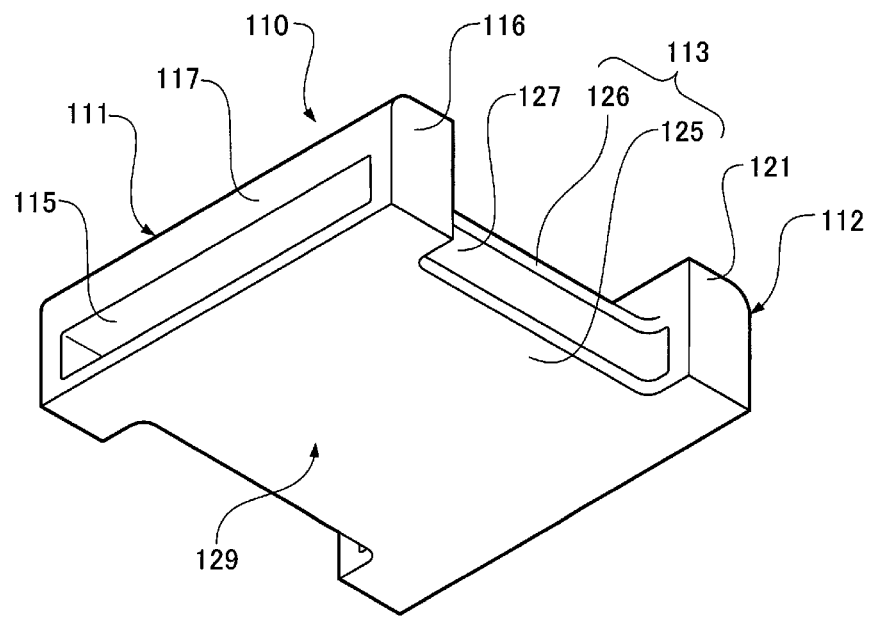
FIG. 33 is a perspective view seen from an inner surface side of the dropout prevention member of the pipe joint in the fourth embodiment of the present invention.

Additionally, as illustrated in FIG. 32 and FIG. 33, the shape of an inner surface side 129 and the shape of an outer surface side 130 of the dropout prevention body 110 in the pipe diameter direction 8 are different from each other. That is, as illustrated in FIG. 32, the outer surface side 130 of the dropout prevention body 110 has an uneven shape including the one projecting portion 116 and the other projecting portion 121. On the other hand, as illustrated in FIG. 33, the inner surface side 129 of the dropout prevention body 110 has a flat shape without the projecting portions 116 and 121.

The actions and effects of a pipe joint 1 will be described below.

When attaching the spacer 30, one end of the board member 30*a* is fit into the fitting portion 43 of the push ring 29 from the inside of the pipes 2 and 4, the other end of the board member 30*a* is made to abut the deep end face 19 of the socket 3, the one abutting surface 117 of the dropout prevention body 110 is made to abut the opposing surface 42 of the push ring 29, and the other abutting surface 122 is made to abut the deep end face 19 of the socket 3. Accordingly, as illustrated in FIG. 30, the spacer 30 is attached between the push ring 29 and the deep end face 19 of the socket 3.

At this time, since the total length L of the dropout prevention body 110 is made slightly longer than the predetermined interval 31 illustrated in FIG. 30, the dropout prevention body 110 is attached in the state where the inner side connecting body 125 and the outer side connecting body 126 are slightly compressed in the pipe axial direction 7.

The interval between the push ring 29 and the deep end face 19 of the socket 3 in the pipe axial direction 7 may be slightly changed with respect to the predetermined interval 31 due to errors in manufacturing of each component, errors at the time of the joining work of the pipes 2 and 4, etc. Even when the interval between the push ring 29 and the deep end face 19 of the socket 3 becomes slightly larger than the predetermined interval 31, since the inner side connecting body 125 and the outer side connecting body 126 of the dropout prevention body 110 are stretched in the pipe axial direction 7, the one abutting surface 117 positively abuts the opposing surface 42 of the push ring 29, and the other abutting surface 122 positively abuts the deep end face 19 of the socket 3.

Additionally, even when the interval between the push ring 29 and the deep end face 19 of the socket 3 becomes slightly smaller than the predetermined interval 31, since the inner side connecting body 125 and the outer side connecting body 126 are shortened in the pipe axial direction 7, the one abutting surface 117 positively abuts the opposing surface 42 of the push ring 29, and the other abutting surface 122 positively abuts the deep end face 19 of the socket 3.

In this manner, since the inner side connecting body 125 and the outer side connecting body 126 are stretched and contracted in the pipe axial direction 7, a slight variation in the interval between the push ring 29 and the deep end face 19 of the socket 3 can be absorbed, and it is possible to prevent the position of the dropout prevention body 110 from shifting in the pipe axial direction 7.

Figure 36:
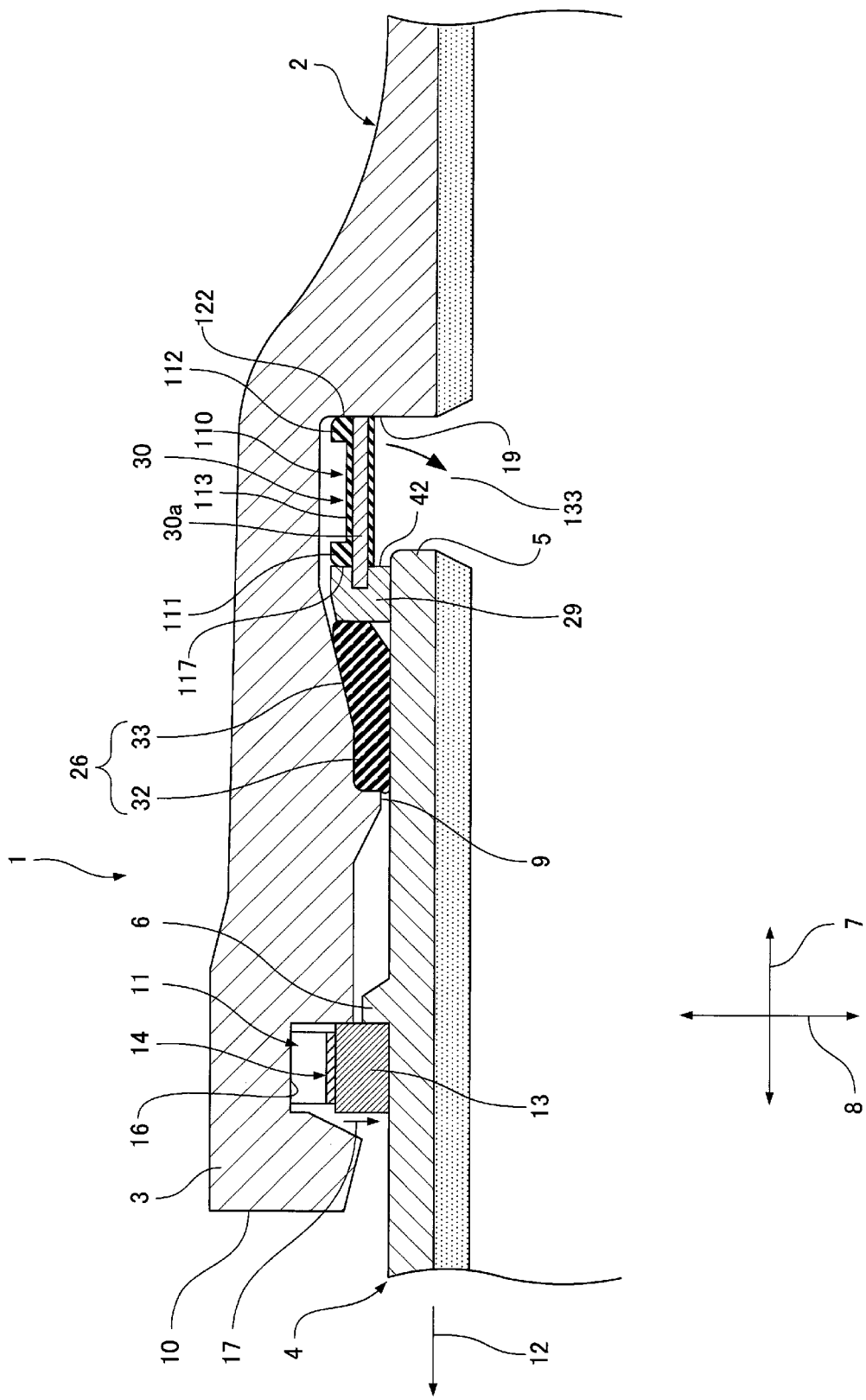
FIG. 36 is a cross-sectional view of the pipe joint in the fourth embodiment of the present invention, illustrating the state where a spigot has been moved in a detachment direction with respect to a socket.
Figure 37:
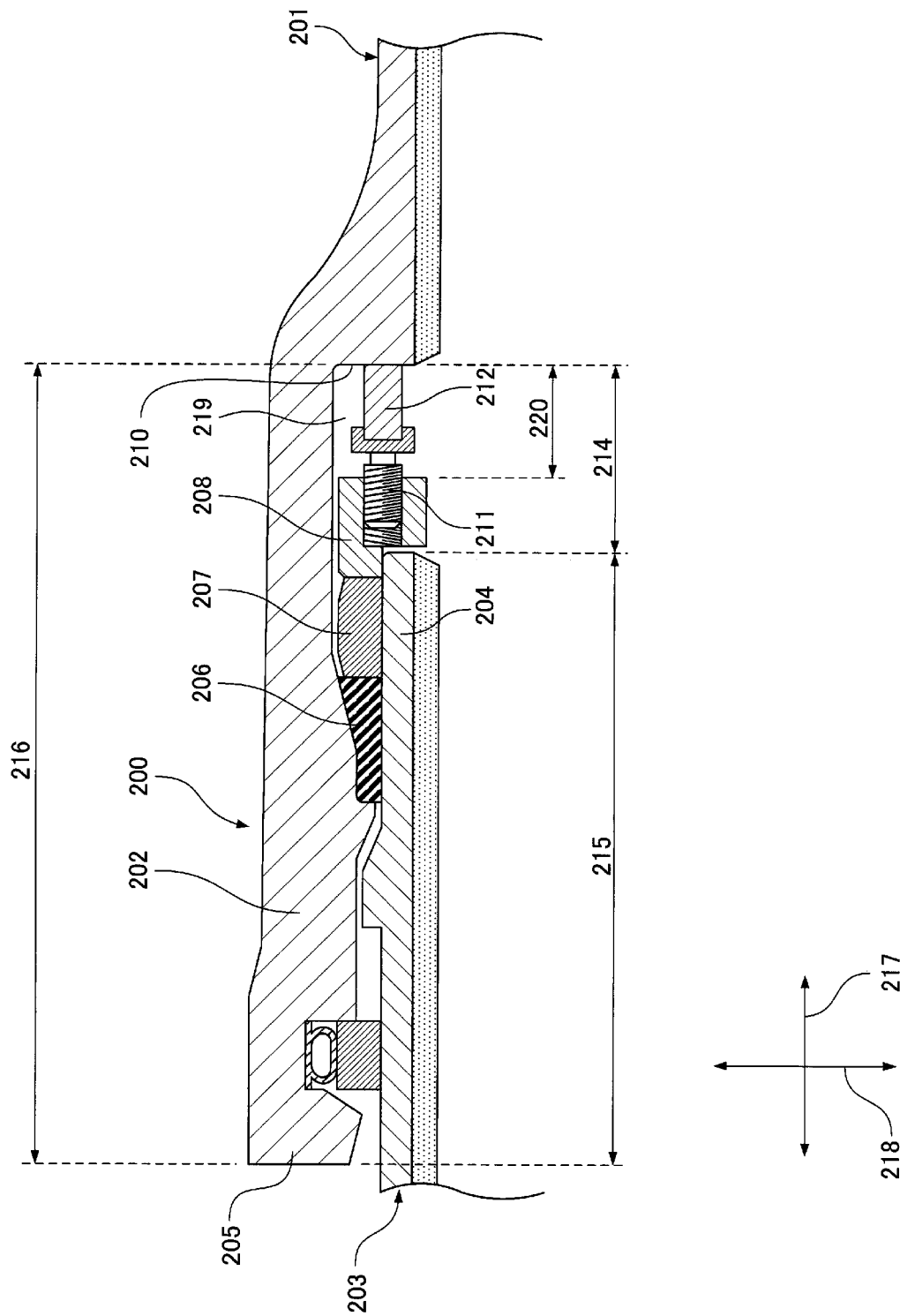
FIG. 37 is a cross-sectional view of a conventional pipe joint.
Figure 38:
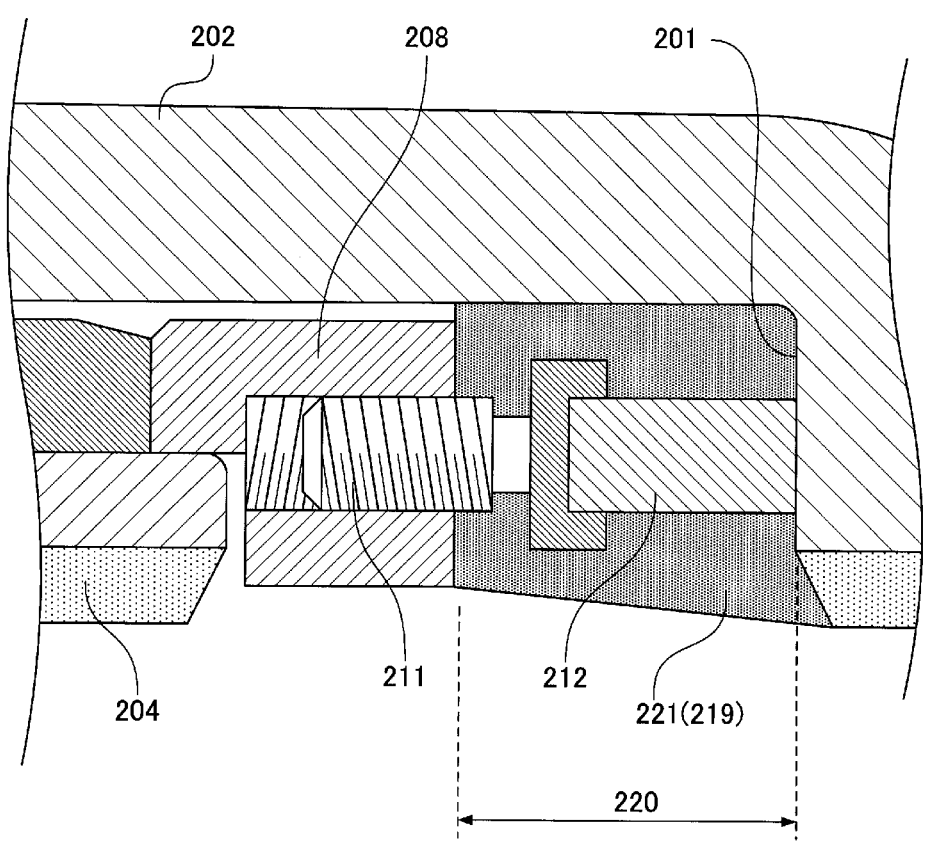
FIG. 38 is a partial enlarged cross-sectional view of the pipe joint in a conventional pipe joint, illustrating the state where a stepped portion has been filled up with mortar.

Additionally, as illustrated in FIG. 36, when a separation force acts on the spigot 5 due to an earthquake, etc., and the spigot 5 is moved in the detachment direction 12 with respect to the socket 3, the outer circumference projecting portion 6 engages with the lock ring 13, and accordingly, it is possible to prevent the spigot 5 from being detached from the socket 3. On this occasion, the top end of the spigot 5 is separated from the deep end face 19 of the socket 3 in the detachment direction 12, and an opening 133 is formed between the top end of the spigot 5 and the deep end face 19 of the socket 3.

At this time, since the one abutting surface 117 of the dropout prevention body 110 abuts the opposing surface 42 of the push ring 29, and the other abutting surface 122 abuts the deep end face 19 of the socket 3, it is possible to prevent the other end of the spacer 30 from coming off from the deep end face 19 of the socket 3, so as to prevent the spacer 30 from dropping out from between the push ring 29 and the deep end face 19 of the socket 3 to the inside of the pipe 2 through the opening 133. In this manner, by providing the dropout prevention body 110 to the board member 30a, it is unnecessary to embed the spacer 30 in the inside of the mortar material, and the time and effort required for joining the pipes 2 and 4 can be reduced.

In each of the aforementioned embodiments, as illustrated in FIG. 1, when the spigot 5 is inserted into the socket 3 to join the pipes 2 and 4, the top end of the spigot 5 is made to abut the deep end face 19 of the socket 3 over the entire circumference. However, the top end of the spigot 5 is not limited to abut the deep end face 19 of the socket 3 over the entire circumference, and a part of the top end of the spigot 5 in a pipe circumference direction 38 may also be made to abut the deep end face 19 of the socket 3. In this manner, by making the top end of the spigot 5 abut the deep end face 19 of the socket 3, the insertion amount of the spigot 5 into the socket 3 can be easily and accurately set to a predetermined insertion amount A.

Further, when the pipes 2 and 4 are joined, the top end of the spigot 5 may not abut the deep end face 19 of the socket 3, and may form a slight gap between the top end of the spigot 5 and the deep end face 19 of the socket 3. Additionally, the top end of the spigot 5 may be configured by an inclusion (illustration omitted), such as a cover, and the top end of the spigot 5 including such an inclusion may abut the deep end face 19 of the socket 3.

Figure 7:
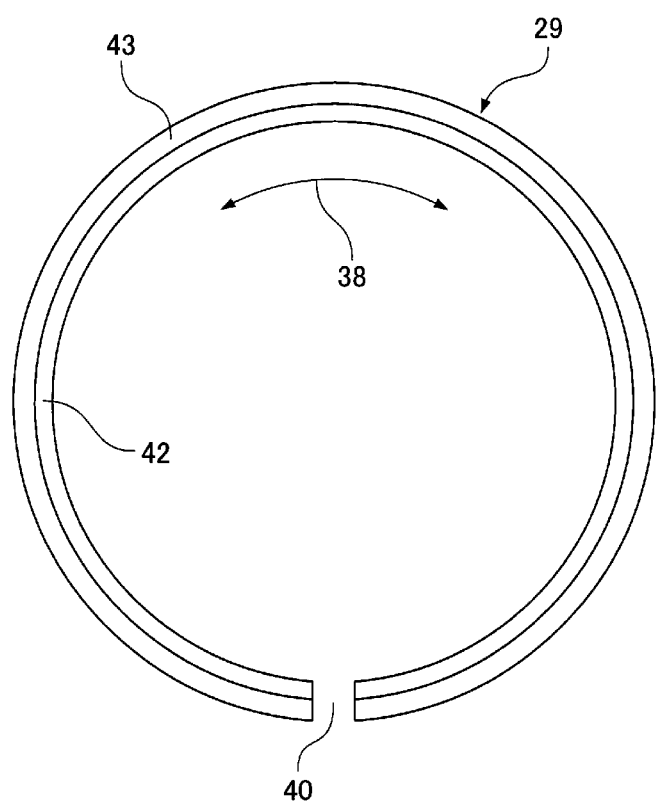
FIG. 7 is a diagram of a push ring of the pipe joint in the first embodiment of the present invention.

Although in each of the aforementioned embodiments, the push ring 29 having a single-split structure is used as illustrated in FIG. 7, the push ring having a multiple-split structure that can be divided into a plurality of circular pieces may also be used.

In each of the aforementioned embodiments, as illustrated in FIG. 10, the push ring 29 is inserted into the inside of the socket 3 before inserting the spigot 5 into the socket 3, and thereafter, as illustrated in FIG. 16, the spigot 5 is inserted into the socket 3, the opening 48 is formed between the top end of the spigot 5 and the deep end face 19 of the socket 3, and as illustrated in FIG. 19, the seal body 26 and the spacer 30 are set to the outer side of the spigot 5 in the pipe diameter direction 8 from the inside of the pipes 2 and 4 through the opening 48. However, the joining procedure is not limited to such a joining procedure, and the spigot 5 may be inserted into the socket 3, the opening 48 may be formed between the top end of the spigot 5 and the deep end face 19 of the socket 3, and as illustrated in FIG. 19, the seal body 26 and the push ring 29 may be set to the outer side of the spigot 5 in the pipe diameter direction 8 from the inside of the pipes 2 and 4 through the opening 48, and thereafter, as illustrated in FIG. 20, the spigot 5 may be inserted into the socket 3 until the top end of the spigot 5 abuts the deep end face 19 of the socket 3.

In each of the aforementioned embodiments, as illustrated in FIG. 16, FIG. 17, and FIG. 19, the spigot 5 is inserted into the inside of the socket 3 from the open end portion 10 of the socket 3, and the seal body 26, the push ring 29, and the spacer 30 are set in the socket 3 in the state where the outer circumference projecting portion 6 has passed through the inner side of the lock ring 13 from the open end portion 10 side of the socket 3 to the back side of the socket 3. However, the joining method is not limited to such a joining method. For example, the pipe 2 and 4 may be joined to each other in the following procedure: the spigot 5 is inserted into the inside of the socket 3 from the open end portion 10 of the socket 3; the seal body 26, the push ring 29, and the spacer 30 are set in the socket 3 in the state where the outer circumference projecting portion 6 is located in the inner side of the lock ring 13, or in the open end portion 10 side further in front of the lock ring 13; thereafter, the spigot 5 is inserted into the socket 3 until the top end of the spigot 5 abuts the deep end face 19 of the socket 3; and a stopper 47 for diameter reduction prevention is removed from the divided portion 15 of the lock ring 13.

Although in each of the aforementioned embodiments, as illustrated in FIG. 1, a pipe joint 1 includes a lock ring accommodation groove 11 and the lock ring 13, the pipe joint 1 also may not include the lock ring accommodation groove 11 and the lock ring 13.

The invention claimed is:

1. A pipe joint, comprising:
a seal body for sealing a gap between a socket of one pipe and a spigot of an other pipe;
a push ring that presses the seal body to keep the seal body in a compressed state, the push ring comprising:
  a pressing surface pressing the seal body; and
  an opposing surface in which a fitting portion is formed, the opposing surface being opposed to a deep end of the socket in a pipe axial direction, a fitting portion being formed in the opposing surface;
a spacer that maintains an interval between the push ring and the deep end of the socket in a pipe axial direction, the spacer having one end that is fitted into the fitting portion and an other end that abuts the deep end of the socket,
wherein the spigot of the other pipe is inserted into the socket of the one pipe, and
wherein an annular accommodation space is formed between an inner circumference of the socket and an outer circumference of the spigot and accommodates the seal body, the push ring, and the spacer.

2. The pipe joint according to claim 1, wherein a top end of the spigot reaches the deep end of the socket.

3. The pipe joint according to claim 1, wherein a plurality of spacers are provided at an interval in a pipe circumference direction, and
a plurality of fitting portions are formed at an interval in a circumference direction of the push ring.

4. The pipe joint according to claim 1,
wherein a lock ring accommodation groove is formed in the inner circumference of the socket,
a lock ring is accommodated in the lock ring accommodation groove, and is externally fit onto the spigot,
an outer circumference projecting portion projecting outward in a pipe diameter direction is formed in the outer circumference of the spigot, and
the outer circumference projecting portion engages with the lock ring from a detachment direction of the spigot, so as to provide a separation preventive function to prevent the spigot from being detached from the socket.

5. The pipe joint according to claim 1,
wherein the seal body includes a valve portion made of a soft elastic body, and a heel portion made of a hard elastic body,
one end portion of the heel portion in the pipe axial direction is integrally connected to the valve portion, and
the seal body is inserted into the accommodation space with the valve portion being a top end.

6. The pipe joint according to claim 1,
wherein an annular projecting portion projecting inward in a pipe diameter direction, and a tapered seal body pressure contact surface are formed in the inner circumference of the socket, and the seal body pressure contact surface is located in a further back side of the socket than the annular projecting portion, and a diameter of the seal body pressure contact surface is reduced toward the annular projecting portion, and the seal body pressure contact surface faces the accommodation space.

7. The pipe joint according to claim 1, wherein a top end of the spigot abuts the deep end of the socket.

8. A push ring used for the pipe joint according to claim 1, the push ring comprising:
   a pressing surface pressing the seal body; and
   a plurality of fitting portions formed at an interval in a circumference direction in a surface opposite to the pressing surface,
   wherein one end of the spacer is configured to fit into the fitting portion.

9. A method of joining pipes by using a pipe joint comprising a seal body for sealing a gap between a socket of one pipe and a spigot of an other pipe, a push ring that presses the seal body to keep the seal body in a compressed state, and a spacer that maintains an interval between the push ring and a deep end of the socket in a pipe axial direction, wherein the push ring includes a pressing surface pressing the seal body and an opposing surface opposed to the deep end of the socket in the pipe axial direction, the fitting portion being formed in the opposing surface, the method comprising:

forming an opening between a top end of the spigot and the deep end of the socket in a state where the spigot is inserted into the socket;

setting at least the seal body and the spacer of the seal body, the push ring, and the spacer to an outer side of the spigot in a pipe diameter direction from an inside of a pipe through the opening;

accommodating the seal body, the push ring, and the spacer in an accommodation space formed between an inner circumference of the socket and an outer circumference of the spigot by further inserting the spigot into the socket to shorten the opening in the pipe axial direction;

fitting one end of the spacer into the fitting portions; and making an other end of the spacer abut the deep end of the socket.

* * * * *